United States Patent
Ryman

(10) Patent No.: US 8,296,441 B2
(45) Date of Patent: Oct. 23, 2012

(54) METHODS AND SYSTEMS FOR JOINING A REAL-TIME SESSION OF PRESENTATION LAYER PROTOCOL DATA

(75) Inventor: Paul Ryman, Dural (AU)

(73) Assignee: Citrix Systems, Inc., Fort Lauderdale, FL (US)

( * ) Notice: Subject to any disclaimer, the term of this patent is extended or adjusted under 35 U.S.C. 154(b) by 259 days.

(21) Appl. No.: 12/609,731

(22) Filed: Oct. 30, 2009

(65) Prior Publication Data

US 2010/0049783 A1     Feb. 25, 2010

Related U.S. Application Data

(63) Continuation-in-part of application No. 11/555,611, filed on Nov. 1, 2006, now Pat. No. 7,996,549, which is a continuation-in-part of application No. 11/036,486, filed on Jan. 14, 2005, now abandoned, and a continuation-in-part of application No. 11/035,851, filed on Jan. 14, 2005, now Pat. No. 8,145,777, and a continuation-in-part of application No. 11/555,615, filed on Nov. 1, 2006, which is a continuation-in-part of application No. 11/036,486, and a continuation-in-part of application No. 11/035,851.

(60) Provisional application No. 60/862,349, filed on Oct. 20, 2006.

(51) Int. Cl.
*G06F 15/16* (2006.01)
(52) U.S. Cl. ...................................... 709/227
(58) Field of Classification Search ............... 709/227
See application file for complete search history.

(56) References Cited

U.S. PATENT DOCUMENTS 4,138,719 A     2/1979 Swanstrom et al.
(Continued)

FOREIGN PATENT DOCUMENTS

EP     0 475 581 A2     3/1992
(Continued)

OTHER PUBLICATIONS

"Remote Desktop Environments Reflected in Local Windows" IBM Technical Disclosure Bulletin, Mar. 1993, vol. 36, Issue 3, pp. 421-426.

(Continued)

*Primary Examiner* — Wing Chan
*Assistant Examiner* — Alicia Baturay
(74) *Attorney, Agent, or Firm* — Foley and Lardner LLP; John D. Lanza

(57) ABSTRACT

Methods and systems directed to joining a real-time user session of presentation layer protocol data. The methods describe a user session receiving a presentation layer protocol data stream, wherein the user session comprises a single presentation layer protocol stack. The protocol stack sending a request to a virtual channel to reinitialize. The virtual channel processing an existing request until the request to reinitialize is encountered. The protocol stack modifying the presentation layer protocol data stream to contain a marker. The systems describe a single presentation layer protocol stack. The protocol stack includes a receiver, a virtual channel, and a rollover agent. The receiver receives a presentation layer protocol data stream and receives a message initiating reinitialization. The virtual channel processes a request. The rollover agent sends to the virtual channel a request to reinitialize and modifies the presentation layer protocol data stream to contain a marker.

12 Claims, 10 Drawing Sheets

U.S. PATENT DOCUMENTS

| | | | |
|---|---|---|---|
| 4,807,029 A | 2/1989 | Tanaka | |
| 4,928,247 A | 5/1990 | Doyle et al. | |
| 4,937,036 A | 6/1990 | Beard et al. | |
| 4,949,248 A | 8/1990 | Caro | |
| 4,965,819 A | 10/1990 | Kannes | |
| 4,974,173 A | 11/1990 | Stefik et al. | |
| 5,021,949 A | 6/1991 | Morten et al. | |
| 5,062,060 A | 10/1991 | Kolnick | |
| 5,072,412 A | 12/1991 | Henderson et al. | |
| 5,083,860 A | 1/1992 | Miyatake et al. | |
| 5,103,305 A | 4/1992 | Watanabe | |
| 5,121,497 A | 6/1992 | Kerr et al. | |
| 5,241,625 A | 8/1993 | Epard et al. | |
| 5,243,596 A * | 9/1993 | Port et al. | 370/231 |
| 5,307,456 A | 4/1994 | MacKay | |
| 5,313,581 A | 5/1994 | Giokas et al. | |
| 5,317,732 A | 5/1994 | Gerlach et al. | |
| 5,359,712 A | 10/1994 | Cohen et al. | |
| 5,382,972 A | 1/1995 | Kannes | |
| 5,388,197 A | 2/1995 | Rayner | |
| 5,392,223 A | 2/1995 | Caci | |
| 5,392,400 A | 2/1995 | Berkowitz et al. | |
| 5,404,316 A | 4/1995 | Klingler et al. | |
| 5,408,655 A | 4/1995 | Oren et al. | |
| 5,432,932 A | 7/1995 | Chen et al. | |
| 5,437,025 A | 7/1995 | Bale et al. | |
| 5,461,711 A | 10/1995 | Wang et al. | |
| 5,550,965 A | 8/1996 | Gabbe et al. | |
| 5,572,258 A | 11/1996 | Yokoyama | |
| 5,572,643 A | 11/1996 | Judson | |
| 5,574,845 A | 11/1996 | Benson et al. | |
| 5,577,188 A | 11/1996 | Zhu | |
| 5,577,254 A | 11/1996 | Gilbert | |
| 5,619,638 A | 4/1997 | Duggan et al. | |
| 5,623,603 A | 4/1997 | Jiang et al. | |
| 5,636,371 A * | 6/1997 | Yu | 703/26 |
| 5,657,390 A | 8/1997 | Elgamal et al. | |
| 5,717,879 A | 2/1998 | Moran et al. | |
| 5,721,827 A | 2/1998 | Logan et al. | |
| 5,727,950 A | 3/1998 | Cook et al. | |
| 5,729,689 A | 3/1998 | Allard et al. | |
| 5,732,216 A | 3/1998 | Logan et al. | |
| 5,734,865 A * | 3/1998 | Yu | 709/250 |
| 5,742,797 A | 4/1998 | Celi et al. | |
| 5,745,759 A | 4/1998 | Hayden et al. | |
| 5,748,499 A * | 5/1998 | Trueblood | 702/187 |
| 5,751,362 A | 5/1998 | Lee | |
| 5,758,110 A | 5/1998 | Boss et al. | |
| 5,761,656 A | 6/1998 | Ben-Shachar | |
| 5,768,614 A | 6/1998 | Takagi et al. | |
| 5,796,566 A | 8/1998 | Sharma et al. | |
| 5,802,206 A | 9/1998 | Marold | |
| 5,822,436 A | 10/1998 | Rhoads | |
| 5,832,119 A | 11/1998 | Rhoads | |
| 5,835,090 A | 11/1998 | Clark et al. | |
| 5,838,300 A | 11/1998 | Takagi et al. | |
| 5,838,458 A | 11/1998 | Tsai | |
| 5,838,906 A | 11/1998 | Doyle et al. | |
| 5,841,978 A | 11/1998 | Rhoads | |
| 5,862,260 A | 1/1999 | Rhoads | |
| 5,867,647 A * | 2/1999 | Haigh et al. | 726/23 |
| 5,886,707 A | 3/1999 | Berg | |
| 5,893,053 A | 4/1999 | Trueblood | |
| 5,907,704 A | 5/1999 | Gudmundson et al. | |
| 5,909,559 A | 6/1999 | So | |
| 5,913,024 A * | 6/1999 | Green et al. | 726/3 |
| 5,915,001 A | 6/1999 | Uppaluru | |
| 5,918,018 A * | 6/1999 | Gooderum et al. | 709/225 |
| 5,923,736 A | 7/1999 | Shachar | |
| 5,935,212 A | 8/1999 | Kalajan et al. | |
| 5,968,132 A | 10/1999 | Tokunaga et al. | |
| 5,983,190 A | 11/1999 | Trower et al. | |
| 5,983,350 A * | 11/1999 | Minear et al. | 726/11 |
| 5,990,852 A | 11/1999 | Szamrej | |
| 6,003,030 A | 12/1999 | Kenner et al. | |
| 6,006,242 A | 12/1999 | Poole et al. | |
| 6,011,537 A | 1/2000 | Slotznick | |
| 6,022,315 A | 2/2000 | Iliff | |
| 6,052,120 A | 4/2000 | Nahi et al. | |
| 6,111,954 A | 8/2000 | Rhoads | |
| 6,122,403 A | 9/2000 | Rhoads | |
| 6,141,699 A | 10/2000 | Luzzi et al. | |
| 6,166,729 A | 12/2000 | Acosta et al. | |
| 6,167,432 A | 12/2000 | Jiang | |
| 6,173,316 B1 | 1/2001 | De Boor et al. | |
| 6,181,736 B1 | 1/2001 | McLaughlin et al. | |
| 6,185,625 B1 | 2/2001 | Tso et al. | |
| 6,199,076 B1 | 3/2001 | Logan et al. | |
| 6,199,753 B1 | 3/2001 | Tracy et al. | |
| 6,201,948 B1 | 3/2001 | Cook et al. | |
| 6,206,829 B1 | 3/2001 | Iliff | |
| 6,219,707 B1 * | 4/2001 | Gooderum et al. | 709/225 |
| 6,219,786 B1 | 4/2001 | Cunningham et al. | |
| 6,233,617 B1 | 5/2001 | Rothwein et al. | |
| 6,237,138 B1 | 5/2001 | Hameluck et al. | |
| 6,243,375 B1 | 6/2001 | Speicher | |
| 6,256,773 B1 | 7/2001 | Bowman-Amuah | |
| 6,263,363 B1 | 7/2001 | Rosenblatt et al. | |
| 6,278,466 B1 | 8/2001 | Chen | |
| 6,286,030 B1 | 9/2001 | Wenig et al. | |
| 6,286,036 B1 | 9/2001 | Rhoads | |
| 6,289,382 B1 | 9/2001 | Bowman-Amuah | |
| 6,289,461 B1 | 9/2001 | Dixon | |
| 6,295,340 B1 | 9/2001 | Cannon et al. | |
| 6,307,550 B1 | 10/2001 | Chen et al. | |
| 6,317,761 B1 | 11/2001 | Landsman et al. | |
| 6,317,781 B1 | 11/2001 | De Boor et al. | |
| 6,321,252 B1 * | 11/2001 | Bhola et al. | 709/204 |
| 6,324,573 B1 | 11/2001 | Rhoads | |
| 6,324,647 B1 | 11/2001 | Bowman-Amuah | |
| 6,331,855 B1 | 12/2001 | Schauser | |
| 6,332,163 B1 | 12/2001 | Bowman-Amuah | |
| 6,332,195 B1 * | 12/2001 | Green et al. | 726/14 |
| 6,338,088 B1 | 1/2002 | Waters et al. | |
| 6,339,832 B1 | 1/2002 | Bowman-Amuah | |
| 6,345,239 B1 | 2/2002 | Bowman-Amuah | |
| 6,351,777 B1 | 2/2002 | Simonoff | |
| 6,356,437 B1 | 3/2002 | Mitchell et al. | |
| 6,366,933 B1 | 4/2002 | Ball et al. | |
| 6,370,573 B1 | 4/2002 | Bowman-Amuah | |
| 6,381,341 B1 | 4/2002 | Rhoads | |
| 6,400,806 B1 | 6/2002 | Uppaluru | |
| 6,400,996 B1 | 6/2002 | Hoffberg et al. | |
| 6,401,118 B1 | 6/2002 | Thomas | |
| 6,405,252 B1 | 6/2002 | Gupta et al. | |
| 6,405,364 B1 | 6/2002 | Bowman-Amuah | |
| 6,408,331 B1 | 6/2002 | Rhoads | |
| 6,421,726 B1 | 7/2002 | Kenner et al. | |
| 6,427,063 B1 | 7/2002 | Cook et al. | |
| 6,427,132 B1 | 7/2002 | Bowman-Amuah | |
| 6,434,568 B1 | 8/2002 | Bowman-Amuah | |
| 6,434,628 B1 | 8/2002 | Bowman-Amuah | |
| 6,437,818 B1 | 8/2002 | Ludwig et al. | |
| 6,438,231 B1 | 8/2002 | Rhoads | |
| 6,438,594 B1 | 8/2002 | Bowman-Amuah | |
| 6,442,748 B1 | 8/2002 | Bowman-Amuah | |
| 6,445,468 B1 | 9/2002 | Tsai | |
| 6,466,654 B1 | 10/2002 | Cooper et al. | |
| 6,470,381 B2 | 10/2002 | De Boor et al. | |
| 6,473,745 B2 | 10/2002 | Doerr et al. | |
| 6,473,794 B1 | 10/2002 | Guheen et al. | |
| 6,477,580 B1 | 11/2002 | Bowman-Amuah | |
| 6,477,665 B1 | 11/2002 | Bowman-Amuah | |
| 6,482,156 B2 | 11/2002 | Iliff | |
| 6,496,850 B1 | 12/2002 | Bowman-Amuah | |
| 6,498,955 B1 | 12/2002 | McCarthy et al. | |
| 6,502,102 B1 | 12/2002 | Haswell et al. | |
| 6,502,125 B1 | 12/2002 | Kenner et al. | |
| 6,502,131 B1 | 12/2002 | Vaid et al. | |
| 6,502,213 B1 | 12/2002 | Bowman-Amuah | |
| 6,519,571 B1 | 2/2003 | Guheen et al. | |
| 6,523,027 B1 | 2/2003 | Underwood | |
| 6,526,335 B1 | 2/2003 | Treyz et al. | |
| 6,529,909 B1 | 3/2003 | Bowman-Amuah | |
| 6,529,948 B1 | 3/2003 | Bowman-Amuah | |
| 6,536,037 B1 | 3/2003 | Guheen et al. | |
| 6,539,336 B1 | 3/2003 | Vock et al. | |

| | | |
|---|---|---|
| 6,539,396 B1 | 3/2003 | Bowman-Amuah |
| 6,539,429 B2 | 3/2003 | Rakavy et al. |
| 6,549,949 B1 | 4/2003 | Bowman-Amuah |
| 6,550,057 B1 | 4/2003 | Bowman-Amuah |
| 6,553,129 B1 | 4/2003 | Rhoads |
| 6,567,533 B1 | 5/2003 | Rhoads |
| 6,567,813 B1 | 5/2003 | Zhu et al. |
| 6,571,282 B1 | 5/2003 | Bowman-Amuah |
| 6,573,907 B1 | 6/2003 | Madrane |
| 6,574,672 B1 | 6/2003 | Mitchell et al. |
| 6,578,068 B1 | 6/2003 | Bowman-Amuah |
| 6,580,808 B2 | 6/2003 | Rhoads |
| 6,584,493 B1 | 6/2003 | Butler |
| 6,584,569 B2 | 6/2003 | Reshef et al. |
| 6,590,998 B2 | 7/2003 | Rhoads |
| 6,597,736 B1 | 7/2003 | Fadel |
| 6,601,087 B1 | 7/2003 | Zhu et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,479 B2 | 8/2003 | Cook et al. |
| 6,606,660 B1 | 8/2003 | Bowman-Amuah |
| 6,606,744 B1 | 8/2003 | Mikurak |
| 6,609,128 B1 | 8/2003 | Underwood |
| 6,611,867 B1 | 8/2003 | Bowman-Amuah |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,629,081 B1 | 9/2003 | Cornelius et al. |
| 6,633,878 B1 | 10/2003 | Underwood |
| 6,636,242 B2 | 10/2003 | Bowman-Amuah |
| 6,640,145 B2 | 10/2003 | Hoffberg et al. |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,647,128 B1 | 11/2003 | Rhoads |
| 6,647,130 B2 | 11/2003 | Rhoads |
| 6,654,032 B1 | 11/2003 | Zhu et al. |
| 6,658,464 B2 | 12/2003 | Reisman |
| 6,662,357 B1 | 12/2003 | Bowman-Amuah |
| 6,665,706 B2 | 12/2003 | Kenner et al. |
| 6,671,818 B1 | 12/2003 | Mikurak |
| 6,671,876 B1 | 12/2003 | Podowski |
| 6,675,204 B2 | 1/2004 | De Boor et al. |
| 6,678,864 B1 | 1/2004 | Tsai |
| 6,681,029 B1 | 1/2004 | Rhoads |
| 6,687,745 B1 | 2/2004 | Franco et al. |
| 6,691,154 B1 | 2/2004 | Zhu et al. |
| 6,697,894 B1 | 2/2004 | Mitchell et al. |
| 6,700,990 B1 | 3/2004 | Rhoads |
| 6,701,345 B1 | 3/2004 | Carley et al. |
| 6,701,514 B1 | 3/2004 | Haswell et al. |
| 6,704,873 B1 | 3/2004 | Underwood |
| 6,711,474 B1 | 3/2004 | Treyz et al. |
| 6,715,145 B1 | 3/2004 | Bowman-Amuah |
| 6,718,535 B1 | 4/2004 | Underwood |
| 6,721,703 B2 | 4/2004 | Jackson et al. |
| 6,721,713 B1 | 4/2004 | Guheen et al. |
| 6,742,015 B1 | 5/2004 | Bowman-Amuah |
| 6,751,320 B2 | 6/2004 | Rhoads |
| 6,760,463 B2 | 7/2004 | Rhoads |
| 6,763,501 B1 | 7/2004 | Zhu et al. |
| 6,774,926 B1 | 8/2004 | Ellis et al. |
| 6,775,392 B1 | 8/2004 | Rhoads |
| 6,795,506 B1 | 9/2004 | Zhang et al. |
| 6,799,221 B1 | 9/2004 | Kenner et al. |
| RE38,609 E | 10/2004 | Chen et al. |
| 6,801,927 B1 | 10/2004 | Smith et al. |
| 6,802,041 B1 | 10/2004 | Rehm |
| 6,810,488 B2 | 10/2004 | Teng |
| 6,813,366 B1 | 11/2004 | Rhoads |
| 6,816,904 B1 | 11/2004 | Ludwig et al. |
| 6,824,044 B1 | 11/2004 | Lapstun et al. |
| 6,842,509 B2 * | 1/2005 | Olafsson ............... 379/93.32 |
| 6,842,906 B1 | 1/2005 | Bowman-Amuah |
| 6,849,045 B2 | 2/2005 | Iliff |
| 6,850,252 B1 | 2/2005 | Hoffberg |
| 6,870,921 B1 | 3/2005 | Elsey et al. |
| 6,877,043 B2 | 4/2005 | Mallory et al. |
| 6,879,701 B1 | 4/2005 | Rhoads |
| 6,880,123 B1 | 4/2005 | Landsman et al. |
| 6,885,736 B2 | 4/2005 | Uppaluru |
| 6,888,844 B2 | 5/2005 | Mallory et al. |
| 6,891,881 B2 | 5/2005 | Trachewsky et al. |
| 6,898,204 B2 | 5/2005 | Trachewsky et al. |
| 6,907,546 B1 | 6/2005 | Haswell et al. |
| 6,914,519 B2 | 7/2005 | Beyda |
| 6,934,376 B1 | 8/2005 | McLaughlin et al. |
| 6,944,279 B2 | 9/2005 | Elsey et al. |
| 6,954,800 B2 | 10/2005 | Mallory |
| 6,957,186 B1 | 10/2005 | Guheen et al. |
| 6,968,057 B2 | 11/2005 | Rhoads |
| 6,968,364 B1 | 11/2005 | Wong et al. |
| 6,975,655 B2 | 12/2005 | Fischer et al. |
| 6,986,459 B2 | 1/2006 | Paul et al. |
| 6,988,126 B2 | 1/2006 | Wilcock et al. |
| 6,988,236 B2 | 1/2006 | Ptasinski et al. |
| 6,993,101 B2 | 1/2006 | Trachewsky et al. |
| 6,996,605 B2 | 2/2006 | Low et al. |
| 7,000,019 B2 | 2/2006 | Low et al. |
| 7,000,031 B2 | 2/2006 | Fischer et al. |
| 7,000,180 B2 | 2/2006 | Balthaser |
| 7,006,881 B1 | 2/2006 | Hoffberg et al. |
| 7,013,323 B1 | 3/2006 | Thomas et al. |
| 7,016,084 B2 | 3/2006 | Tsai |
| 7,023,979 B1 | 4/2006 | Wu et al. |
| 7,024,456 B1 | 4/2006 | Simonoff |
| 7,027,055 B2 | 4/2006 | Anderson et al. |
| 7,032,030 B1 | 4/2006 | Codignotto |
| 7,035,285 B2 | 4/2006 | Holloway et al. |
| 7,035,427 B2 | 4/2006 | Rhoads |
| 7,035,907 B1 | 4/2006 | Decasper et al. |
| 7,043,529 B1 | 5/2006 | Simonoff |
| 7,043,669 B2 | 5/2006 | Brown |
| 7,047,092 B2 | 5/2006 | Wimsatt |
| 7,054,465 B2 | 5/2006 | Rhoads |
| 7,058,697 B2 | 6/2006 | Rhoads |
| 7,069,234 B1 | 6/2006 | Cornelius et al. |
| 7,069,332 B2 | 6/2006 | Shibata et al. |
| 7,073,126 B1 | 7/2006 | Khandekar |
| 7,073,189 B2 | 7/2006 | McElhatten et al. |
| 7,082,572 B2 | 7/2006 | Pea et al. |
| 7,089,487 B2 | 8/2006 | Tsai |
| 7,092,370 B2 | 8/2006 | Jiang et al. |
| 7,100,195 B1 | 8/2006 | Underwood |
| 7,103,197 B2 | 9/2006 | Rhoads |
| 7,113,596 B2 | 9/2006 | Rhoads |
| 7,113,614 B2 | 9/2006 | Rhoads |
| 7,116,781 B2 | 10/2006 | Rhoads |
| 7,124,101 B1 | 10/2006 | Mikurak |
| 7,124,175 B1 | 10/2006 | Wolfe et al. |
| 7,130,403 B2 | 10/2006 | Caspi et al. |
| 7,130,807 B1 | 10/2006 | Mikurak |
| 7,133,085 B2 | 11/2006 | Morita et al. |
| 7,133,837 B1 | 11/2006 | Barnes, Jr. |
| 7,139,999 B2 | 11/2006 | Bowman-Amuah |
| 7,149,698 B2 | 12/2006 | Guheen et al. |
| 7,149,788 B1 | 12/2006 | Gundla et al. |
| 7,149,898 B2 * | 12/2006 | Marejka et al. ............... 713/176 |
| 7,165,041 B1 | 1/2007 | Guheen et al. |
| 7,167,844 B1 | 1/2007 | Leong et al. |
| 7,171,016 B1 | 1/2007 | Rhoads |
| 7,171,174 B2 | 1/2007 | Ellis et al. |
| 7,174,126 B2 | 2/2007 | McElhatten et al. |
| 7,184,531 B2 | 2/2007 | Crouch |
| 7,185,283 B1 | 2/2007 | Takahashi |
| 7,213,211 B1 | 5/2007 | Sanders et al. |
| 7,225,130 B2 | 5/2007 | Roth et al. |
| 7,228,340 B2 | 6/2007 | De Boor et al. |
| 7,313,613 B1 | 12/2007 | Brooking et al. |
| 7,337,206 B1 * | 2/2008 | Wen et al. ............... 709/200 |
| 7,398,320 B1 | 7/2008 | Minakuchi et al. |
| 7,401,116 B1 | 7/2008 | Chalfin et al. |
| 7,490,166 B2 | 2/2009 | Yang et al. |
| 7,558,806 B2 | 7/2009 | Bobrovskiy et al. |
| 7,760,652 B2 * | 7/2010 | Tsillas et al. ............... 370/242 |
| 7,831,728 B2 * | 11/2010 | Ryman ............... 709/231 |
| 7,996,549 B2 * | 8/2011 | Ryman ............... 709/231 |

| | | | |
|---|---|---|---|
| 2001/0019630 A1 | 9/2001 | Johnson | |
| 2001/0056547 A1 | 12/2001 | Dixon | |
| 2002/0032770 A1 | 3/2002 | Fertell et al. | |
| 2002/0033844 A1 | 3/2002 | Levy et al. | |
| 2002/0035451 A1 | 3/2002 | Rothermel | |
| 2002/0038388 A1 | 3/2002 | Netter | |
| 2002/0048450 A1 | 4/2002 | Zetts | |
| 2002/0052932 A1 | 5/2002 | Curtis et al. | |
| 2002/0126144 A1 | 9/2002 | Chenede | |
| 2002/0149617 A1 | 10/2002 | Becker | |
| 2002/0165922 A1 | 11/2002 | Wei | |
| 2002/0174181 A1 | 11/2002 | Wei | |
| 2002/0194272 A1 | 12/2002 | Zhu | |
| 2003/0018662 A1 | 1/2003 | Li | |
| 2003/0035384 A1* | 2/2003 | Cline et al. | 370/286 |
| 2003/0055896 A1 | 3/2003 | Hu et al. | |
| 2003/0061355 A1 | 3/2003 | Yang et al. | |
| 2003/0079224 A1 | 4/2003 | Komar et al. | |
| 2003/0084169 A1 | 5/2003 | Zhu et al. | |
| 2003/0085922 A1 | 5/2003 | Wei | |
| 2003/0093566 A1* | 5/2003 | Jardin | 709/246 |
| 2003/0110266 A1 | 6/2003 | Rollins et al. | |
| 2003/0133464 A1* | 7/2003 | Marejka et al. | 370/411 |
| 2003/0135656 A1 | 7/2003 | Schneider et al. | |
| 2003/0140149 A1* | 7/2003 | Marejka et al. | 709/229 |
| 2003/0163704 A1* | 8/2003 | Dick et al. | 713/178 |
| 2003/0164853 A1 | 9/2003 | Zhu et al. | |
| 2003/0167293 A1 | 9/2003 | Zhu et al. | |
| 2003/0167301 A1 | 9/2003 | Zhu et al. | |
| 2003/0167302 A1 | 9/2003 | Zhu et al. | |
| 2003/0167303 A1 | 9/2003 | Zhu et al. | |
| 2003/0167304 A1 | 9/2003 | Zhu et al. | |
| 2003/0167305 A1 | 9/2003 | Zhu et al. | |
| 2003/0167339 A1 | 9/2003 | Zhu et al. | |
| 2003/0167418 A1 | 9/2003 | Zhu et al. | |
| 2003/0177172 A1 | 9/2003 | Duursma et al. | |
| 2003/0182375 A1 | 9/2003 | Zhu et al. | |
| 2003/0191799 A1 | 10/2003 | Araujo et al. | |
| 2003/0208529 A1 | 11/2003 | Pendyala et al. | |
| 2003/0220973 A1 | 11/2003 | Zhu et al. | |
| 2003/0226038 A1 | 12/2003 | Raanan et al. | |
| 2004/0002048 A1 | 1/2004 | Thurmaier et al. | |
| 2004/0017394 A1 | 1/2004 | Adachi | |
| 2004/0031058 A1 | 2/2004 | Reisman | |
| 2004/0044521 A1 | 3/2004 | Chen et al. | |
| 2004/0103438 A1 | 5/2004 | Yan et al. | |
| 2004/0128401 A1* | 7/2004 | Fallon et al. | 709/250 |
| 2004/0135974 A1 | 7/2004 | Favalora et al. | |
| 2004/0143602 A1 | 7/2004 | Ruiz et al. | |
| 2004/0205213 A1 | 10/2004 | Paz et al. | |
| 2004/0207723 A1 | 10/2004 | Davis et al. | |
| 2004/0240387 A1 | 12/2004 | Nuzman et al. | |
| 2004/0267820 A1 | 12/2004 | Boss et al. | |
| 2004/0267952 A1 | 12/2004 | He et al. | |
| 2005/0019014 A1 | 1/2005 | Yoo et al. | |
| 2005/0080850 A1 | 4/2005 | Salesky et al. | |
| 2005/0132417 A1 | 6/2005 | Bobrovskiy et al. | |
| 2005/0254775 A1 | 11/2005 | Hamilton et al. | |
| 2006/0064716 A1 | 3/2006 | Sull et al. | |
| 2006/0130124 A1 | 6/2006 | Richardson et al. | |
| 2006/0136475 A1* | 6/2006 | Karmakar et al. | 707/102 |
| 2006/0161671 A1* | 7/2006 | Ryman et al. | 709/230 |
| 2006/0161959 A1* | 7/2006 | Ryman et al. | 725/88 |
| 2006/0274828 A1 | 12/2006 | Siemens et al. | |
| 2007/0005795 A1 | 1/2007 | Gonzalez | |
| 2007/0022155 A1 | 1/2007 | Owens et al. | |
| 2007/0057952 A1 | 3/2007 | Swedberg et al. | |
| 2007/0106681 A1 | 5/2007 | Haot et al. | |
| 2007/0106811 A1* | 5/2007 | Ryman | 709/230 |
| 2008/0068289 A1 | 3/2008 | Piasecki | |
| 2009/0282444 A1* | 11/2009 | Laksono et al. | 725/89 |
| 2010/0049797 A1* | 2/2010 | Ryman | 709/203 |
| 2010/0050077 A1* | 2/2010 | Ryman | 715/704 |

FOREIGN PATENT DOCUMENTS

| | | |
|---|---|---|
| EP | 0 495 612 A2 | 7/1992 |
| EP | 0 645 695 | 3/1995 |
| EP | 1 469 382 | 10/2004 |
| GB | 2 327 836 | 2/1999 |
| WO | WO-2006/076389 A2 | 7/2006 |

OTHER PUBLICATIONS

Adrian Nye, XLIB Programming Manual, Rel. 5, Third Edition, Jun. 30, 1994, O'Reilly Media, Inc., chapter 2.

Christiansen, B.O., Schauser, K.E., Munke, M.; "A Novel Codec for Thin Client Computing,"In Proceedings of the IEEE Data Compression Conference, Snowbird, UT, Mar. 28-30, 2000, pp. 1-10.

Christiansen, B.O., Schauser, K.E., Munke, M.; "Streaming Thin Client Compression," In Proceedings of the IEEE Data Compression Conference, Snowbird, UT, Mar. 27-29, 2001, pp. 1-10.

Communication pursuant to Article 94(3) EP Application No. 07119879.0-1525; Dated Jun. 20, 2008; 8 pages.

Communication pursuant to Article 94(3) EPC EP Application No. 07120005.9-1525; Dated Jun. 20, 2008; 9 pages.

Communication Pursuant to Article 94(3) EPC for EP Application No. 07119991.3.-1525; Dated Jun. 20, 2008; 12 pages.

Communication pursuant to Article 96(2) EPC dated Oct. 24, 2007; EP Application No. 06718013.3-1525; 6 pages.

Communication pursuant to Article 96(2) EPC EP Application No. 06718012.5-1525; Dated Oct. 24, 2007; 5 pages.

Crusty, "The Un-Official XviD FAQ," Mar. 4, 2004, pp. 1-50.

Cruz, G. and Hill, R., "Capturing and Playing Multimedia Events with STREAMS", in Proceedings of ACM Multimedia '94, San Francisco, CA, Oct. 15-20, 1994, pp. 193-200.

De Alwis, B., "Screen Capturing and Playback Using VNC," http://www.cs.ubc.ca/{bsd/vncrecording.html, Oct. 31, 2004.

Dennis Baker, Using Xinerama to Multihead XFree86 V.4.0 [Online], Nov. 15, 2002, XP002417796. Available at: http://www.tldp.org/HOWTO/Xinerama-HOWTO/.

European Exam Report for 06718012.5 dated May 27, 2011.

European Search Report EP Application No. 07119879 completed Jan. 16, 2008; 5 pages.

Extended European Search Report EP 0712005; Dated Dec. 14, 2007; 6 pages.

Extended European Search Report from EP Application No. 07119991.3-1525 completed Mar. 4, 2008; 9 pages.

Final Office Action dated Apr. 14, 2010, pertaining to U.S. Appl. No. 11/036,489, 24 pages.

Final Office Action dated Jan. 6, 2009, pertaining to U.S. Appl. No. 11/036,486, 46 pages.

Final Office Action dated Jan. 20, 2010, pertaining to U.S. Appl. No. 11/555,611, 19 pages.

Final Office Action dated Jul. 7, 2009, pertaining to U.S. Appl. No. 11/036,489, 16 pages.

Final Office Action dated Mar. 16, 2010, pertaining to U.S. Appl. No. 11/036,486, 41 pages.

Final Office Action dated Nov. 9, 2009, pertaining to U.S. Appl. No. 11/555,615, 30 pages.

Final Office Action dated Sep. 15, 2009, pertaining to U.S. Appl. No. 11/035,851, 13 pages.

International Search Report for PCT/US2006/038629. Mailing Date Feb. 23, 2007. 3 pages.

International Search Report, PCT/US2006/000887, Jul. 24, 2006.

International Search Report, PCT/US2006/000888, Aug. 31, 2006.

International Search Report, PCT/US2007/081751, Nov. 5, 2008.

Krishnakumar A. S. et al., "VLSI Implementations of Communication Protocols—A Survey" IEEE Journal on Selected Areas in Communications, IEEE Service Center, Piscataway, NJ, vol. 7, No. 7, Sep. 1, 1989, pp. 1082-1090.

Lamming, M.G., "Towards a Human Memory Prosthesis", Technical Report EPC-91-116, Copyright.RTM. Rank Xerox EuroPARC, Published in Proceedings of International Workshop Lecture Notes in Computer Science '91, Dagstuhl, Berlin, Jul. 1991.

Lamming, M.G., and Newman, W.M., "Activity-based Information Retrieval Technology in Support of Personal Memory," Technical Report EPC-91-103.1, Copyright.RTM. Rank Xerox EuroPARC 1991, pp. 1-16.

Non Final Office Action dated Apr. 14, 2009, pertaining to U.S. Appl. No. 11/035,851, 11 pages.

Non Final Office Action dated Apr. 29, 2008, pertaining to U.S. Appl. No. 11/036,486, 20 pages.
Non Final Office Action dated Aug. 3, 2009, pertaining to U.S. Appl. No. 11/036,486, 39 pages.
Non Final Office Action dated Dec. 10, 2008, pertaining to U.S. Appl. No. 11/036,489, 17 pages.
Non Final Office Action dated Jun. 3, 2009, pertaining to U.S. Appl. No. 11/555,611, 16 pages.
Non Final Office Action dated Mar. 30, 2009, pertaining to U.S. Appl. No. 11/555,615, 25 pages.
Non Final Office Action dated May 26, 2009, pertaining to U.S. Appl. No. 11/036,840, 11 pages.
Non Final Office Action dated Sep. 4, 2009, pertaining to U.S. Appl. No. 11/036,489, 21 pages.
Non-Final Office Action dated Dec. 23, 2009, pertaining to U.S. Appl. No. 11/035,511, 10 pages.
Non-Final Office Action dated Jan. 4, 2010, pertaining to U.S. Appl. No. 11/035,851, 14 pages.
Notice of Allowance on U.S. Appl. No. 11/035,851 dated Dec. 12, 2011.
Office Action for U.S. Appl. No. 11/035,511 dated Mar. 30, 2011.
Office Action for U.S. Appl. No. 11/035,851 dated Aug. 19, 2010.
Office Action for U.S. Appl. No. 11/036,489 dated Jun. 7, 2011.
Office Action for U.S. Appl. No. 11/555,611 dated Sep. 30, 2010.
Office Action on U.S. Appl. No. 11/035,511 dated Jan. 18, 2012.
Office Action on U.S. Appl. No. 11/036,489 dated Oct. 14, 2011.
Partial European Search Report completed on Dec. 14, 2007; EP Application No. EP07119991; 3 pages.
Pedersen, E.R., McCall, K., Moran, T.P., and Halasz, F.G., "Tivoli: An Electronic Whiteboard for Informal Workgroup Meetings," Interchi '93, Apr. 24-29, 1993, pp. 391-398.
Reilly, R., "Today's Linux Screen Capture Technology," Newsforge, http://software.newsforge.com/article.pl?sid=04/08/16/2128226, Aug. 17, 2004.
Rhyne, J.R., and Wolf, C.G., "Tools for Supporting the Collaborative Process," in Proceedings of the ACM Symposium on User Interface Software and Technology, Monterey, California, Nov. 15-18, 1992, pp. 161-170.
Sandklef H., "Testing Applications with Xnee," Linux Journal, vol. 2004, No. 117, 2004, pp. 1-6.
Sandklef, H., "Xnee Manual," Manual Version 1.08D, http://web.archive.org/web/20040627125613/www.gnu.org/software/xnee/www/m-anual/xnee.pdf, Oct. 3, 2003.
Smith, Advanced Linux Networking, Jun. 11, 2002, Addison Wesley Professional, Chapter 14, Section 4.
Stanonik, R., "Recording/Playing Both Gaze Date and Computer Interaction," http://hci.ucsd.edu/eye/gaze.txt, Nov. 30, 2000.
Stanonik, R., "Reversing the VNC Record File," http://web.archive.org/web/20060703115503/http://hci.ucsd.edu/eye/reversi- ng.txt, Mar. 18, 2002.
Wolf, C.G., Rhyne, J.R., and Briggs, L.K., "Communication and Information Retrieval with a Pen-based Meeting Support Tool," CSCW 92 Proceedings, Nov. 1992, pp. 322-329.
Written Opinion of the International Searching Authority for PCT/US2006/038629 dated Jan. 31, 2007.
Written Opinion of the International Searching Authority to PCT/US2006/000887 (Jul. 4, 2006).
Written Opinion of the International Searching Authority to PCT/US2006/000888(Jul. 7, 2006).
X Desktop Group: "Extended window manager hints" [Online], May 13, 2003, Available at: http://standards.freedesktop.org/wm-spec/wm-spec-latest.html.
Zeldovich, N. et al., "Interactive Performance Measurement with VNCPlay," USENIX 2005 Annual Technical Conference.
Chinese Office Action on 200780047081.9 dated Nov. 23, 2011.

* cited by examiner

355 a client establishes a connection with a server and the server establishing a remote presentation layer protocol stack

360 the shadowing agent service receives and stores a first data stream from remote presentation layer protocol stack

365 a shadower establishes a connection with a shadowing agent service on the server

370 the shadowing agent service receives second data stream from the shadowing tool executing on the shadower

375 the shadowing agent service injects the remote presentation layer protocol stack with data from the shadowing tool

380 the shadowing agent service transmits recorded data stream and real-time data stream to the shadowing tool

385 the shadowing tool joins or merges the recorded and real-time data streams received from the shadowing agent service to create a single output stream for rendering 000
METHODS AND SYSTEMS FOR JOINING A REAL-TIME SESSION OF PRESENTATION LAYER PROTOCOL DATA

CROSS-REFERENCE TO RELATED APPLICATIONS

This application claims priority to U.S. application Ser. No. 11/036,486, entitled "Method and Systems for Capture and Replay of Remote Presentation Protocol Data," filed on Jan. 14, 2005 and U.S. application Ser. No. 11/035,851, entitled "Method and System for Real-Time Seeking During Playback of Remote Presentation Protocols," filed on Jan. 14, 2005.

This application also claims priority to U.S. application Ser. No. 11/555,611, entitled "Methods and Systems for Recording and Real-Time Playback of Presentation Layer Protocol Data," filed Nov. 1, 2006; and U.S. patent application Ser. No. 11/555,615, entitled "Methods and Systems for Real-Time Seeking During Real-Time Playback of a Presentation Layer Protocol Data Stream," filed on Nov. 1, 2006, each of which:

is a continuation-in-part of U.S. application Ser. No. 11/036,486, entitled "Method and Systems for Capture and Replay of Remote Presentation Protocol Data," filed on Jan. 14, 2005, is a continuation-in-part of U.S. application Ser. No. 11/035,851, entitled "Method and System for Real-Time Seeking During Playback of Remote Presentation Protocols," filed on Jan. 14, 2005, and claims priority to a U.S. Provisional Patent Application Ser. No. 60/862,349, entitled "Method for Recording, Real-Time Seeking, and Real-Time Playback of Presentation Layer Protocol Data," file Oct. 20, 2006.

The entire disclosures of all of which are incorporated herein by reference in their entirety for any and all purposes.

FIELD OF THE INVENTION

The present invention relates to systems and methods for providing shadowing of recorded and real-time playback of presentation layer protocol data and, in particular, for providing single-stack shadowing of recorded and real-time playback of presentation layer protocol data.

BACKGROUND

A corporate environment may include several different kinds of computers utilized by users of all different skill levels. Often, corporations provide technical support to people working in the corporate environment. Such assistance may include support for user-errors and hardware malfunctions.

Generally, due to the large scale of corporations, it is difficult for technical support staff to provide assistance in person, especially if the corporation has offices in different geographic areas, perhaps globally. When dealing with inexperienced users or with a wide variety of computer models and manufacturers which may be running different software, it may be difficult to accurately assess or diagnose the technical problem from a distance, especially if the user is unable to accurately communicate the actions they have taken on the computer to the support staff. Shadowing is a technique employed by support staff to service technical problems. Shadowing is the ability of a third party to connect to a user's session, typically through a server, to monitor the current session and take control of the user session in order to provide assistance.

Different types of problems are commonly encountered in such a setting. The technologies currently available to deal with the above described problems generally have scalability issues. Many companies utilize virtualization or remote access software. Each time a user logs on to a system, they create a virtual session on a server. Currently, when users encounter technical problems, support staff may shadow the user's session by creating another virtual session and communicating between the sessions. A significantly negative impact on the system occurs when the server is not capable of adequately processing user requests due to limited available resources.

Additionally, when certain operating systems and software programs do not have multi-session capabilities, support staff is prevented from shadowing to provide technical assistance using known methods and technologies.

SUMMARY OF THE INVENTION

In its broadest interpretation, this disclosure describes methods and systems for single-stack shadowing of presentation layer protocol data. The present invention provides shadowing capabilities to operating systems that do not have multi-session capabilities by utilizing a single presentation layer protocol stack. A remote presentation layer protocol may be the ICA protocol manufactured by Citrix Systems, Inc., of Ft. Lauderdale, Fla., the X protocol by the X.org Foundation, the Virtual Network Computing protocol of AT&T Corp., or the RDP protocol, manufactured by Microsoft Corporation of Redmond, Wash. Additionally, by utilizing a single presentation layer protocol stack, the present invention overcomes issues of scalability and permits several shadowers to shadow a user session. The approach also allows support staff to provide technical support to individuals using an operating system or software that does not have multi-session capabilities. Furthermore, the present disclosure describes methods and systems that may be used in a variety of ways besides shadowing, such as broadcasting a session to a large number of users during a presentation or in a classroom environment.

In one aspect, described herein are embodiments of methods for controlling a real-time user session of presentation layer protocol data. A server establishes a shadowing agent service and a user session comprising a single presentation layer protocol stack for communication with a client agent. The shadowing agent service receives a connection request from a shadowing tool executing on a computing device. The shadowing agent service initiates a rollover operation responsive to receipt of the connection request. The rollover operation includes reinitializing the single presentation layer protocol stack and receiving a first presentation layer protocol data stream from the single presentation layer protocol stack. The shadowing agent service receives a second presentation layer protocol data stream from the shadowing tool. The shadowing agent service inserts data from the second presentation layer protocol data stream into the single presentation layer protocol stack.

In one embodiment the shadowing agent service stores the first presentation layer protocol data stream in a plurality of files stored on the server. In a further embodiment, the shadowing agent service deletes the plurality of files once the client agent disconnects from the server.

In another embodiment, the shadowing agent service initiates the rollover operation when either a predetermined file size or a durational threshold is met and creates a new file to store the first presentation layer protocol data stream.

In another embodiment, the shadowing agent service deletes an oldest existing file storing the first presentation layer protocol data stream, retaining at least two files storing the first presentation layer protocol data stream.

In another embodiment, the shadowing agent service stores the first data stream in volatile memory of the server. In a further embodiment, the shadowing agent service encrypts the stored data stream in volatile memory. In still a further embodiment, the shadowing agent service stores the first data stream as a process-local temporary file designated for deletion upon close of the process.

In another embodiment, the shadowing agent service communicates with a permission agent executing in the user session to obtain permission to grant the connection request from the shadowing tool.

In another embodiment, the shadowing agent service deletes the stored data stream once the client agent disconnects from the server.

In another aspect, described herein are embodiments of systems for controlling a real-time user session of presentation layer protocol data. A server establishing a shadowing agent service and a user session comprising a single presentation layer protocol stack for communication with a client agent. A controller of the shadowing agent service receiving a connection request from a shadowing tool executing on a computing device. A recorder of the shadowing agent service initiating a rollover operation responsive to receipt of the connection request. The rollover comprises reinitializing the single presentation layer protocol stack and receiving a first presentation layer protocol data stream from the single presentation layer protocol stack. The controller receiving a second presentation layer protocol data stream from the shadowing tool. The controller inserting data from the second presentation layer protocol data stream into the single presentation layer protocol stack.

In another embodiment, the shadowing agent service stores the first presentation layer protocol data stream in a plurality of files stored on the server. In a further embodiment, the shadowing agent service deletes the plurality of files once the client agent disconnects from the server.

In another embodiment, the shadowing agent service initiates the rollover operation when one of a predetermined file size and durational threshold is met and creating a new file to store the first presentation layer protocol data stream. In still a further embodiment, the shadowing agent service deletes an oldest existing file storing the first presentation layer protocol data stream, retaining at least two files storing the first presentation layer protocol data stream.

In another embodiment, the shadowing agent service stores the first data stream in volatile memory of the server. In a further embodiment, the shadowing agent service encrypts the stored data stream in volatile memory. In still a further embodiment, the shadowing agent service stores the first data stream as a process-local temporary file designated for deletion upon close of the process.

In another embodiment, the shadowing agent service communicates with a permission agent executing in the user session to obtain permission to grant the connection request from the shadowing tool.

In another embodiment, the shadowing agent service deletes the stored data stream once the client agent disconnects from the server.

BRIEF DESCRIPTION OF DRAWINGS

The foregoing and other objects, aspects, features, and advantages of the present invention will become more apparent and better understood by referring to the following description taken in conjunction with the accompanying drawings, in which:

FIG. 3B is a flow diagram of an embodiment of a method for providing recorded and real-time data using a single remote presentation layer protocol stack.

In the drawings, like reference numbers generally indicate identical, functionally similar, and/or structurally similar elements.

DETAILED DESCRIPTION

Figure 1A:
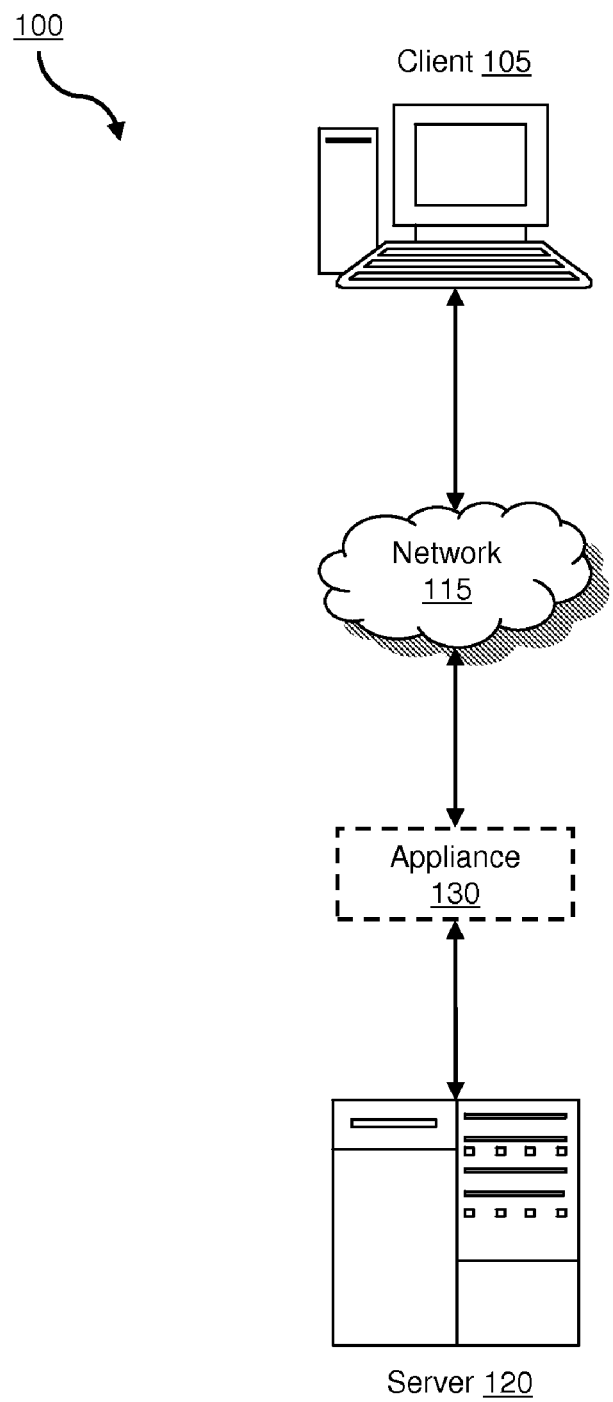
FIG. 1A is a block diagram that depicts an embodiment of a computing environment including a client machine and a server.

FIG. 1A illustrates an embodiment of a computing environment 100 consisting of a client 105 in communication with a server 120 which communicate over a network 115. The client 105 and server 120 may be deployed as and/or executed on any type and form of computing device, such as a computer, network device or appliance capable of communicating on any type and form of network and performing the operations described herein. In some embodiments, more than one client machine 105 communicate with more than one server 120. In another embodiment a single server 120 communicates with more than one client machine 105. In other embodiments a single client machine 105 communicates with more than one server 120.

A client machine 105 within the computing environment may in some embodiments, be referenced by any of the following terms: client machine(s) 105; client(s); client computer(s); client device(s); client computing device(s); client node(s); endpoint(s); endpoint node(s); or a first machine. The server 120 in some embodiments may be references by any of the following terms: server(s); server farm(s); host computing device(s); or a second machine(s).

A client 105 may comprise any personal computer (e.g. based on a microprocessor from the x86 family, the Pentium family, the 680x0 family, PowerPC, PA-RISC, MIPS families, the ARM family, the Cell family), network computer, wireless device (e.g. mobile computer, PDA, smartphone), information appliance, workstation, minicomputer, mainframe computer, telecommunications or media device that is capable of communication and that has sufficient processor power and memory capacity to perform the operations described herein.

Operating systems supported by the client 105 can include any member of the WINDOWS family of operating systems from Microsoft Corporation of Redmond, Wash.; Mac OS from Apple Inc. of Cupertino, Calif.; JAVA OS from Sun Microsystems of Santa Clara, Calif.; various varieties of Unix (e.g. Solaris, SunOS, Linux, HP-UX, A/IX, and BSD-based distributions), any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT. 3.51, WINDOWS NT 4.0, WINDOWS CE, WINDOWS XP, WINDOWS VISTA, WINDOWS 7, all of which are manufactured by Microsoft Corporation of Redmond, Wash.; Mac OS X, manufactured by Apple Inc. of Cupertino, Calif.; OS/2, manufactured by International Business Machines of Armonk, N.Y.; and Linux, an open source operating system distributed by, among others, Red Hat, Inc., and any type and/or form of a Unix operating system, among others.

A client 105 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on the client 105. In some embodiments, the application may be a server-based or a remote-based application executed on behalf of the client 105 on a server 120. In one embodiment, the server 120 may display output to the client 105 using any thin-client or remote-display protocol, such as the Independent Computing Architecture (ICA) protocol from Citrix Systems, Inc. of Ft. Lauderdale, Fla. or the Remote Desktop Protocol (RDP) manufactured from the Microsoft Corporation of Redmond, Wash. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

In one embodiment, the client machine 105 can be a virtual machine, such as those manufactured by XenSolutions, Citrix Systems, IBM, VMware, or any other virtual machine able to implement the methods and systems described herein.

The server 120 may be a file server, application server, web server, proxy server, appliance, network appliance, gateway, application gateway, gateway server, virtualization server, deployment server, SSL VPN server, or firewall. In some embodiments, a server 120 may have the capacity to function as either an application server or as a master application server. In one embodiment, a server 120 may include an Active Directory.

In some embodiments, a server may include a hypervisor. A hypervisor is a computer platform virtualization software that allows multiple operating systems to run on a computing device concurrently. A hypervisor may provide virtual resources to an operating system in any manner that simulates the operating system having access to a physical device. In some embodiments, a computing device executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XenServer provided by Citrix Systems, Inc.; HyperV, VirtualServer or virtual PC hypervisors provided by Microsoft, or others. In some embodiments, a computing device executing a hypervisor, which creates a virtual machine platform on which guest operating systems may execute is referred to as a host server. In one of these embodiments, for example, the computing device is a XexServer provided by Citrix Systems, Inc.

In some embodiments, a hypervisor executes within an operating system executing on a computing device. In one of these embodiments, a computing device executing an operating system and a hypervisor may be said to have a host operating system (the operating system executing on the computing device), and a guest operating system (an operating system executing within a computing resource partition provided by the hypervisor). In other embodiments, a hypervisor interacts directly with hardware on a computing device, instead of executing on a host operating system. In one of these embodiments, the hypervisor may be said to be executing on "bare metal," referring to the hardware including the computing device.

In some embodiments, a hypervisor may create a virtual machine in which an operating system executes. In one of these embodiments, for example, the hypervisor loads a virtual machine image to create a virtual machine. In another of these embodiments, the hypervisor executes an operating system within the virtual machine. In still another of these embodiments, the virtual machine executes an operating system.

In some embodiments, the server 120 may be executing one or more applications, such as an application providing a thin-client computing or remote display presentation application. In one embodiment, the server 120 executes as an application, any portion of the Citrix Delivery Center™ by Citrix Systems, Inc., such as the XenServer™, and/or any of the MICROSOFT WINDOWS Terminal Services manufactured by the Microsoft Corporation. In another embodiment, the application includes a Remote Desktop Protocol (RDP) client, developed by Microsoft Corporation of Redmond, Wash., or an X11 client, maintained by the open source X.org Foundation. In still another embodiment, the server 120 may execute an application, which for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Systems, Inc. of Fort Lauderdale, Fla.; WEBEX provided by Cisco Systems Inc., of San Jose, Calif.; or LIVE MEETING provided by Microsoft Corporation of Redmond, Wash.

The network 115 is configured to communicatively connect the client 105 and the server 120. The network 115 may be a wired or wireless network. Examples of the network 115 include the Internet, an intranet, a WiFi network, a WiMAX network, a mobile telephone network, or a combination thereof. The network 115 may be any type and/or form of network and may include any of the following: a point to point network, a broadcast network, a wide area network, a local area network, a telecommunication network, a data communication network, a computer network, an ATM (Asynchronous Transfer Mode) network, a SONET (Synchronous Optical Network) network, a SDH (Synchronous Digital Hierarchy) network, a wireless network, and a wireline network. In some embodiments, the network 115 may comprise a wireless link, such as an infrared channel or satellite band.

The topology of the network 115 may be a bus, star, or ring network topology. The network 115 and network topology may be of any such network or network topology as known to those ordinarily skilled in the art capable of supporting the operations described herein. The network 115 may comprise mobile telephone networks utilizing any protocol or protocols used to communicate among mobile devices, including AMPS, TDMA, CDMA, GSM, GPRS, or UMTS. In some embodiments, different types of data may be transmitted via different protocols. In other embodiments, the same types of data may be transmitted via different protocols. Although FIG. 1A shows a network 115 between the client 105 and the server 120, the clients 105 and the server 120 may be on the same or different network 115. In some embodiments, there are multiple networks 115 between the client 105 and the server 120. In such embodiments, the multiple networks 115 may be any combination of public and private networks.

In some embodiments, an optional appliance 130 may reside within the computing environment, generally between the server 120 and the network 115. The appliance 130 may be an application acceleration appliance. The appliance 130 may provide functionality including firewall functionality, application firewall functionality, or load balancing functionality. In some embodiments, the appliance 130 comprises an appliance such as one of the line of appliances manufactured by the Citrix Systems, Inc., of Fort Lauderdale, Fla., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

Figure 1B:
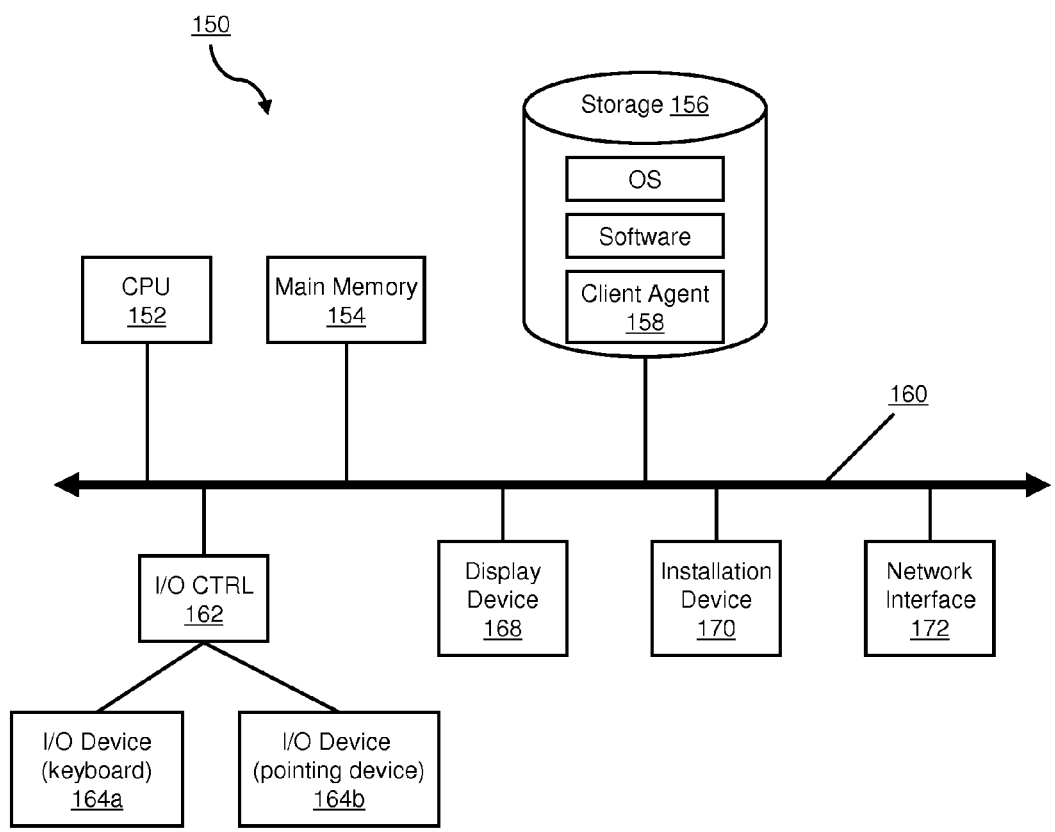
FIGS. 1B and 1C are block diagrams of computing devices that may be used in any of the embodiments of the systems and methods described herein.

FIG. 1B depicts a block diagram of a computing device 150 useful for practicing an embodiment of a client 105, a shadower 110, or a server 120. In some embodiments, the computing device 150 is structured to include a central processing unit 152, memory 154, storage 156, network interfaces 172, and applicable operating system and other functional software (e.g. network drivers, communication protocols). As shown in FIG. 1B, a computing device 150 may include a visual display device 168, and an input/output (I/O) device (generally referred to using reference numeral 164), such as a keyboard 164*a* and/or a pointing device 164*b*, such as a mouse, stylus, or touchpad.

Figure 1C:
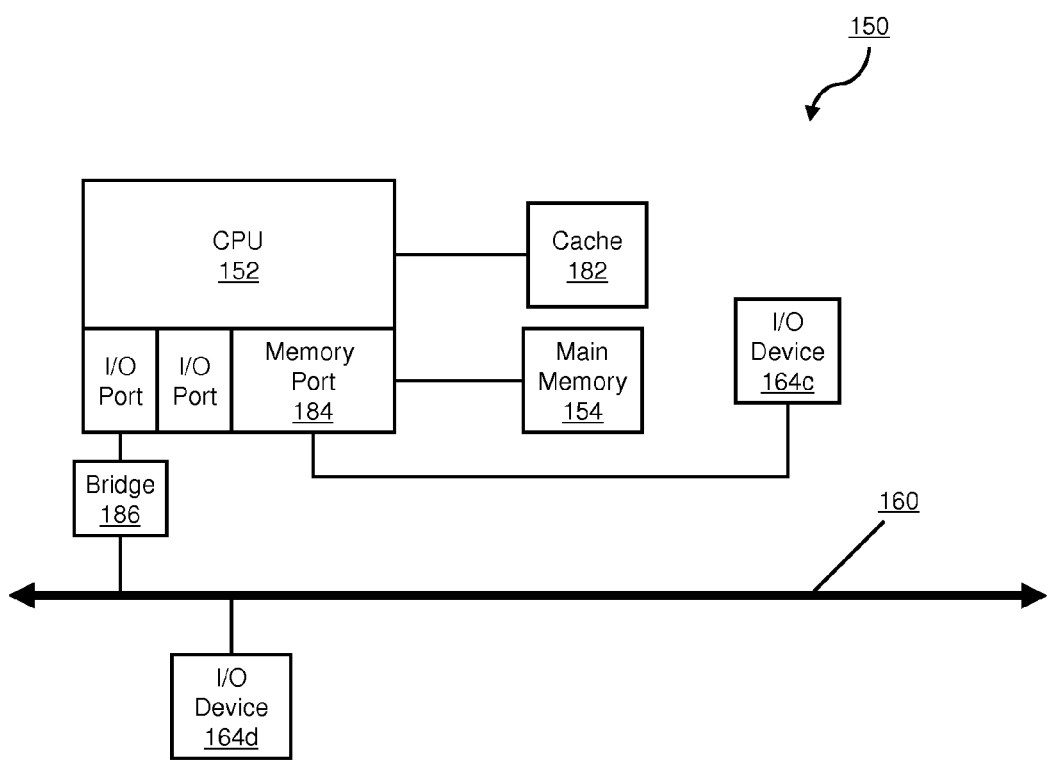

Referring now to FIG. 1C, each computing device 150 may also include additional optional elements, such as one or more I/O devices 164*c*-164*d*, and a cache memory 182 in communication with the CPU 152.

The CPU 152 is any logic circuitry that responds to and processes instructions fetched from the main memory unit 154. In many embodiments, the CPU 152 is provided by a microprocessor unit, such as: those manufactured by Intel Corporation of Santa Clara, Calif.; those manufactured by Motorola Inc., of Schaumburg, Ill.; those manufactured by Transmeta Corporation of Santa Clara, Calif.; those manufactured by International Business Machines of Armonk, N.Y.; or those manufactured by Advanced Micro Devices, Inc. of Sunnyvale, Calif. The computing device 150 may be based on any of these processors, or any other processor capable of operating as described herein.

Main memory unit 154 may be one or more memory chips capable of storing data and allowing any storage location to be directly accessed by the CPU 152, such as static random access memory (SRAM), burst SRAM or synchburst SRAM (BSRAM), dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 154 may be based on any of the above described memory chips, or any other available memory chips capable of operating as described herein. In the embodiment shown in FIG. 1B, the CPU 152 communicates with main memory 154 via a system bus 160. FIG. 1C depicts an embodiment of a computing device 150 in which the CPU 152 communicates directly with main memory 154 via a memory port 184.

FIG. 1C depicts an embodiment in which the CPU 152 communicates directly with cache memory 182 via a secondary bus, sometimes referred to as a backside bus. In other embodiments, the CPU 152 communicates with cache memory 182 using the system bus 160. Cache memory 182 typically has a faster response time than main memory 154 and is typically provided by SRAM, BSRAM, or EDRAM. In the embodiment shown in FIG. 1C, the CPU 152 communicates with various I/O devices 164 via a local system bus 160. Various buses may be used to connect the CPU 152 to any of the I/O devices 164, including a VESA VL bus, an ISA bus, an EISA bus, a MicroChannel Architecture (MCA) bus, a PCI bus, a PCI-X bus, a PCI-Express bus, or a NuBus. For embodiments in which the I/O device 164 is a video display 168, the CPU 152 may use an Advanced Graphics Port (AGP) to communicate with the display 168. FIG. 1C depicts an embodiment of a computer 150 in which the CPU 152 communicates directly with I/O device 164*c* via HyperTransport, Rapid I/O, or InfiniBand. FIG. 1C also depicts an embodiment in which local busses and direct communication are mixed: the CPU 152 communicates with I/O device 164*d* using a local interconnect bus while communicating with I/O device 164*c* directly.

The computing device 150 may support any suitable installation device 170, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 158, or portion thereof. The computing device 150 may further comprise a storage device 156, such as one or more hard disk drives or redundant arrays of independent disks, for storing an operating system and other related software, and for storing application software programs such as any program related to the client agent 158. Optionally, any of the installation devices 170 could also be used as the storage device 156. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 150 may include a network interface 172 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 172 may comprise a built-in network adapter, network interface card, PCMCIA network card, card bus network adapter, wireless network adapter, USB network adapter, modem or any other device suitable for interfacing the computing device 150 to any type of network capable of communication and performing the operations described herein.

A wide variety of I/O devices 164 may be present in the computing device 150. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 162 as shown in FIG. 1B. The I/O controller 162 may control one or more I/O devices 164 such as a keyboard and a pointing device, e.g., a mouse or optical pen. Furthermore, an I/O device 164 may also provide storage 156 and/or an installation medium 170 for the computing device 150. In still other embodiments, the computing device 150 may provide USB connections to receive handheld USB storage devices such as the USB Flash Drive line of devices manufactured by Twintech Industry, Inc. of Los Alamitos, Calif.

In some embodiments, the computing device 150 may comprise or be connected to multiple display devices 168, which each may be of the same or different type and/or form. As such, any of the I/O devices 164 and/or the I/O controller 162 may comprise any type and/or form of suitable hardware, software, or combination of hardware and software to support, enable or provide for the connection and use of multiple display devices 168 by the computing device 150. For example, the computing device 150 may include any type and/or form of video adapter, video card, driver, and/or library to interface, communicate, connect or otherwise use the display devices 168. In one embodiment, a video adapter may comprise multiple connectors to interface to multiple display devices 168. In other embodiments, the computing device 150 may include multiple video adapters, with each video adapter connected to one or more of the display devices 168. In some embodiments, any portion of the operating system of the computing device 150 may be configured for using multiple displays 168. In other embodiments, one or more of the display devices 168 may be provided by one or more other computing devices, where other clients 105, shadowers 110, or server 120 are connected to the computing device 150, for example, via a network 115. These embodiments may include any type of software designed and constructed to use another computer's display device as a second display device 168 for the computing device 150. One ordinarily skilled in the art will recognize and appreciate the various ways and embodiments that a computing device 150 may be configured to have multiple display devices 168.

In further embodiments, an I/O device 164 may be a bridge 186 between the system bus 160 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 150 of the sort depicted in FIGS. 1B and 1C typically operates under the control of operating systems, which control scheduling of tasks and access to system resources. The computing device 150 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In some embodiments, the computing device 150 may have different processors, operating systems, and input devices consistent with the device. For example, in one embodiment the computing device 150 is a Treo 180, 270, 600, 650, 680, 700p or 700w smart phone manufactured by Palm, Inc. In some of these embodiments, the Treo smart phone is operated under the control of the PalmOS operating system and includes a stylus input device as well as a five-way navigator device.

In other embodiments the computing device 150 is a mobile device, such as a JAVA-enabled cellular telephone or personal digital assistant (PDA), such as the i55sr, i58sr, i85s, i88s, i90c, i95cl, or the im11000, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea.

In still other embodiments, the computing device 150 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 150 is a smart phone, Pocket PC, Pocket PC Phone, or other handheld mobile device supporting Microsoft Windows Mobile Software. In other embodiments, the computing device 150 is an iPhone from Apple Inc. Moreover, the computing device 150 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 2A:
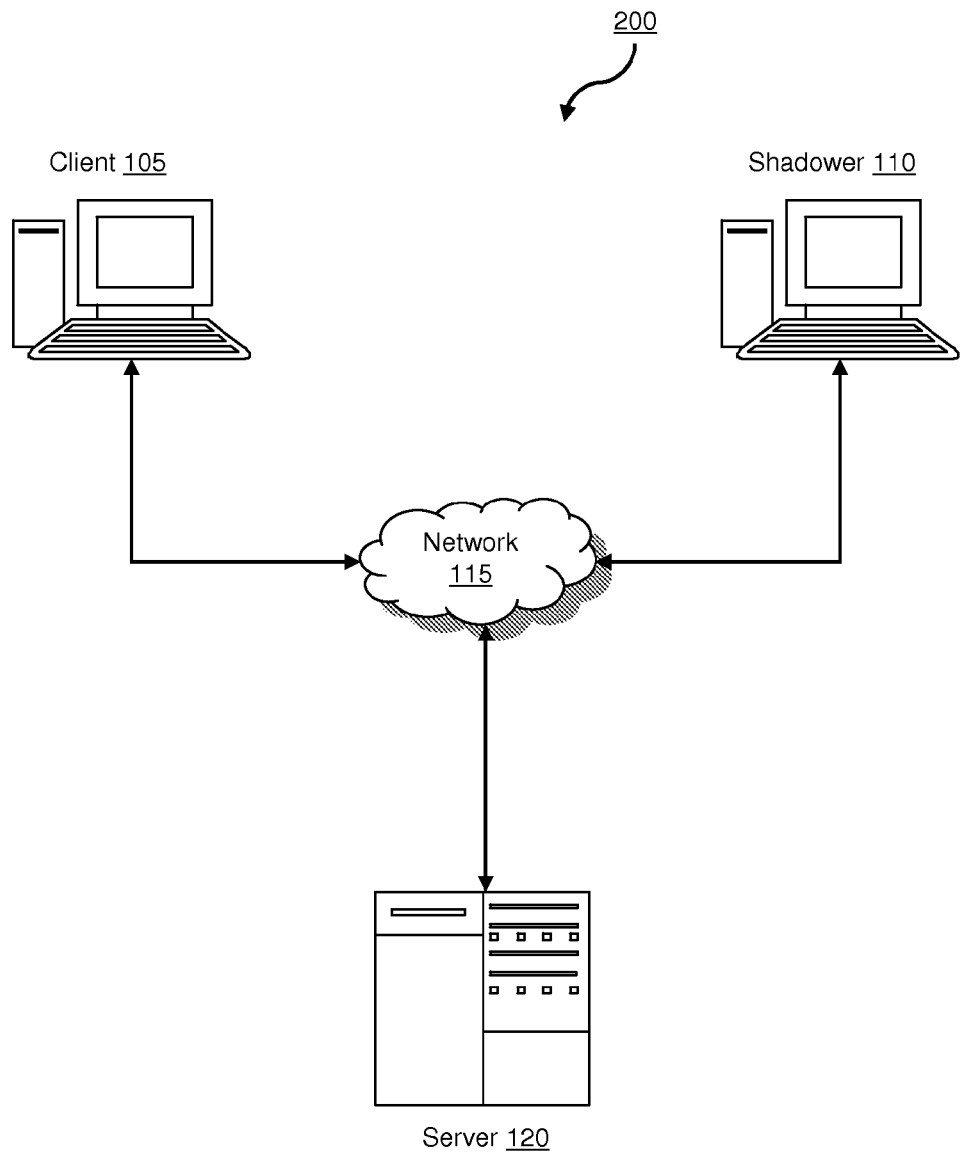
FIG. 2A is a block diagram that depicts an embodiment of a system for providing single stack shadowing.

Referring now to FIG. 2A, a block diagram depicts an embodiment of a system for single stack shadowing of remote presentation layer protocol data. In brief overview, the system 200 includes a client 105 in communication with a server 120, a shadower 110 in communication with a server 120, and a network 115 installed between the client 105, server 120 and shadower 110. In some embodiments, the shadower 110 and client 105 may be of any type of computing device as described herein. In some embodiments, the shadower 110 and the server 120 may execute on the same computing device. In other embodiments, the shadower 100 and the server 120 may be separate computing devices.

One embodiment includes a single client machine 105 communicating with more than one server 120 and more than one shadower 110. In another embodiment, a single client machine 105 communicates with a single server 120 and more than one shadower 110. In another embodiment, more than one client 105 communicates with a single server 120 and a single shadower 110. In another embodiment, a single client machine 105 communicates with more than one server 120 and a single shadower 110. In another embodiment, more than one client 105 communicates with more than one server 120 and a single shadower 110. In another embodiment, more than one client 105 communicates with a single server 120 and more than one shadower 110. In another embodiment, more than one client 105 communicates with more than one server 120 and more than one shadower 110.

A client machine 105 within the computing environment 200 may in some embodiments be referred to as any one of the following terms: client(s) 105; client machine(s); client device(s); client computing device(s); client node(s); endpoint(s); or a first machine; The server 120 in some embodiments may be referenced by any of the following terms: server 120; server farm(s); host computing device(s); or a second machine. A shadower 110 in some embodiments may be referenced by any of the following terms: shadower 110; shadowing device(s); shadowing computing device(s); or a third machine.

Referring now to FIG. 2A in more detail, in the depicted computing environment 200 a client 105 establishes communication with a server 120 over a network 115. A shadower 110 may establish a connection with the server 120 after the client 105 has established a connection. In some embodiments, a shadower 110 is able to monitor the real-time session of the client 105 through the server 120 by establishing a connection with the server 120 over the network after the client 105 has already established a connection with the server 120. In other embodiments, a shadower 110 is able to monitor a recorded session of the client 105 by establishing a connection to the server 120 over the network 115 and accessing the recorded session stored in a storage element of the server 120. In some embodiments the storage element may be separate from the server 120 but accessed by establishing a connection to the server 120. In some embodiments, a shadower 110 is able to monitor both the real-time and recorded sessions in a seamless session where there is no visual difference between the recorded and real-time sessions where the shadower 110 establishes a connection over the network 115 to the server where real-time presentation layer protocol is extracted from the user session established when the client 105 established a connection over the network 115 to the server 120. In some embodiments, a shadower 110 is able to control a monitored real-time user session.

Figure 2B:
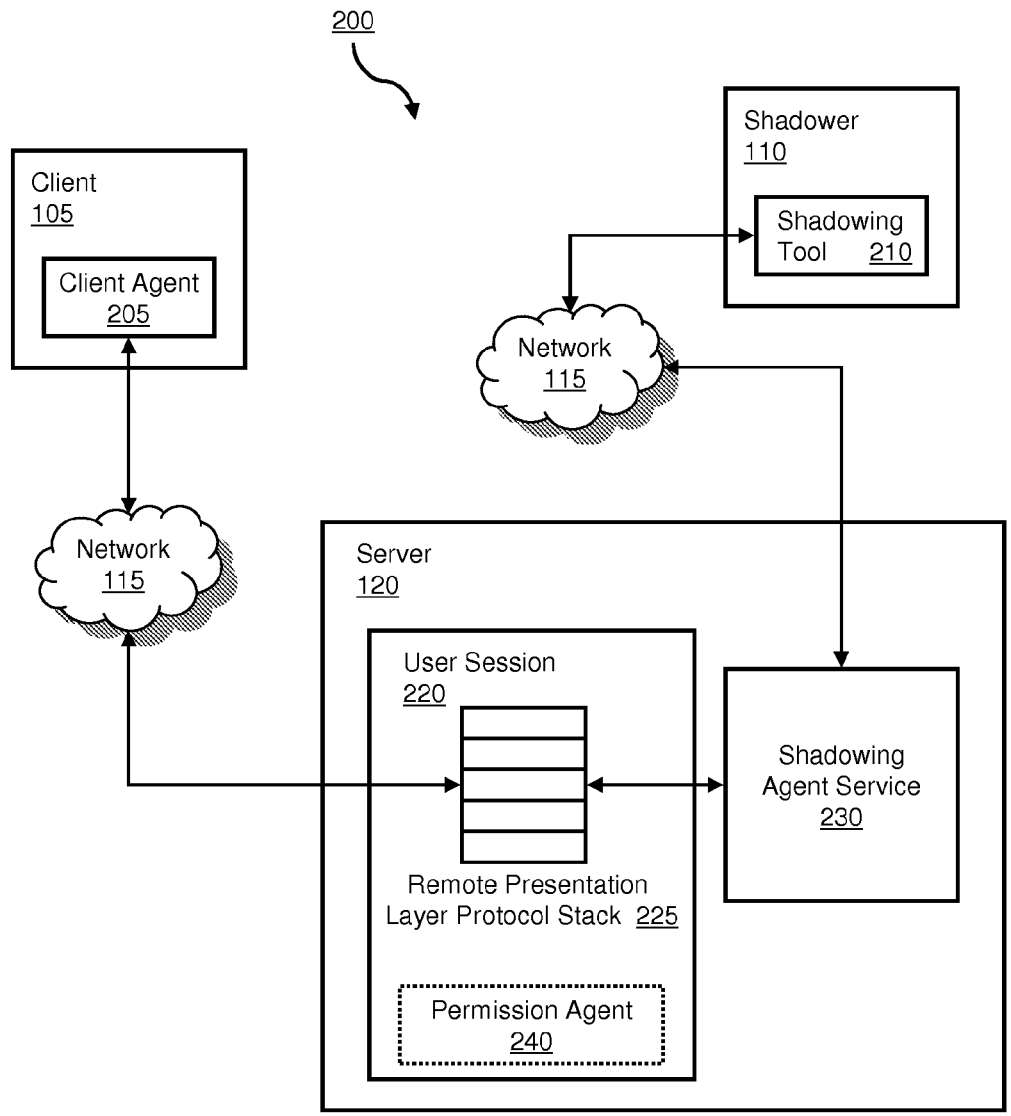
FIG. 2B is block diagram that depicts a more detailed embodiment of a system for providing single stack shadowing.

Referring now to FIG. 2B, a block diagram depicting an embodiment of a system for single stack shadowing in more detail. In brief overview, the system 200 includes a client 105, a server 120, and a shadower 110. A client agent 205 executes on the client 105. A shadowing tool 210 executes on the shadower 110. The client 105 establishes a connection with the server 120 over the network 115. The server 120 establishes a user session 220 containing a remote presentation layer protocol stack 225. The server 120 also executes a shadowing agent service 230. The shadowing tool 210 executing on the shadower 110 establishes a connection with the shadowing agent service 230 executing on the server 120. The server 120 may optionally include a permission agent 240. The shadowing agent service 230 processes data received from the remote presentation layer protocol stack 225 and data received from the shadower 110 sent by the shadowing tool 210. The shadowing agent service 230 communicates over the network 115 to permit the shadower 110 to control the user session 220. The shadowing agent service 230 also is capable of recording the history of the user session 220 by receiving and storing a data stream from the client 105. A recorded remote presentation layer protocol data stream and a real-time remote presentation layer protocol data stream are transmitted to the shadowing tool 210 which is then seamlessly joined and presented to the shadower.

Although FIG. 2B shows a network 115 between the client 105, the shadower 110, and the server 120, the client 105, server 120, and shadower 110 may be on the same network 115 or on different networks, as discussed above.

Referring now to FIG. 2B, and in more detail, the client 105 establishes a connection with the server 120. The server 120 establishes a user session 220 containing a remote presentation layer protocol stack 225. The client agent 205 executing on the client 105 communicates with the user session 220 executing on the server 120. The client agent 205 transmits and receives protocol data streams to and from the server 120. In some embodiments, a plurality of clients 105 executing client agents 205 may connect with a server 120. In other embodiments a client 105 executing a client agent 205 may connect with a plurality of servers 120. In other embodiments a plurality of clients 105 executing client agents 205 may connect with a plurality of servers 120. In some embodiments, the shadowing agent service 230 is a software module executing on the server 120. The shadowing agent service 230 transmits and receives protocol data streams to and from the remote presentation layer protocol stack 225 and a shadowing tool 210 executing on a shadower 110.

A shadower 110 establishes a connection with the shadowing agent service 230 executing on the server 120. A shadowing tool 210 executes on the shadower 110. In some embodiments, when a shadower establishes a connection with the shadowing agent service 230, the shadowing agent service 230 communicates with the permission agent 240 to determine the level access granted to the shadower, prior to initiating a rollover, described herein. In some embodiments, when a shadower establishes a connection with the shadowing agent service 230, the shadowing agent service 230 generates a request to initiate a rollover and transmits the request to the remote presentation layer protocol stack 225 executing within a user session 220 of the server 120.

The shadowing tool 210 communicates with the shadowing agent service 230 executing on the server. The shadowing tool 210 transmits and receives data to and from the shadowing agent service 230. In some embodiments, a plurality of shadowers 110 executing shadowing tools 210 may establish a connection with a shadowing agent service 230. In some embodiments, a shadower 110 executing a shadowing tool 210 may establish a connection with a plurality of shadowing agent services 230 each executing on a different server 120. In some embodiments, a shadower 110 executing a shadowing tool 210 may establish a connection with a shadowing agent service 230 executing on a single server 120 but communicating with a plurality of user sessions 220.

In some embodiments, a shadower 110 may monitor and control the user session 220 of a client 105. The shadowing agent service 230 processes data streams received from the remote presentation layer protocol stack 225 and the shadowing tool 210 and injects the data stream from the data stream from the shadowing tool 210 into the remote presentation layer protocol stack, permitting the shadower 110 to take control of the user session 220. The presentation layer protocol data stream generated from the shadowing tool may include include keyboard and mouse events.

In some embodiments, a shadower 110 may monitor but not control the user session 220 of a client 105. The shadowing tool 210 receives the unmodified remote presentation layer protocol data stream from the remote presentation layer protocol stack 225 which is then rendered by the shadower 110. The data stream is also transmitted from the remote presentation layer protocol stack 225 to the client 105 displaying the session controlled by the client 105.

In some embodiments, the shadowing agent service 230 receives and stores the modified first data stream from the remote presentation layer protocol stack 225. In some embodiments, the data stream is stored in a plurality of files using rollover. Upon reaching a certain predetermined file size or durational threshold, a rollover is initiated causing the remote presentation layer protocol stack 225 to clear its virtual channels and reset them to their original state, close the file currently recording data from the user session, and creating a new file to continue storing data from the current user session. Threshold based limits prevent overwhelming the shadower with excessive recorded data. The threshold based limits also prevent excessive storage on the server 120 hosting the shadowing agent service 230. In some embodiments, a new file is created when a predetermined file size threshold is met. In other embodiments, a new file is created when a predetermined durational threshold is met. The shadowing agent service 230 deletes the oldest existing file while keeping at least two files in order to provide the shadower with adequate recorded data. This creates a rolling window of recorded data over the session ensuring enough data is always available to the shadower, no matter when a shadower connects. As the file formats for the stored data streams are so compact, the impact on memory and disk space will be minimal. If the shadower requests to review past session activity, the completed recording files not yet deleted and current recording file are available to the shadower 110. In some embodiments, the shadowing agent service will stitch the files into a single data stream by concatenating the files sequentially. In some embodiments, the shadowing tool receives the recording files and the current recording file and stitch, merge, or concatenate the files to provide a single data stream. The single stream is provided to the shadower 110 allowing the user to view the recorded and real time data as one seamlessly joined stream. In some embodiments the composite file may be any pre-determined duration. In other embodiments, the composite file may be limited by the storage resources available on the server or other storage element. In other embodiments, the composite file may be between four and eight hours in length, assuming the user session has been running for at least four hours.

In some embodiments, the shadowing agent service 230 deletes the plurality of files containing a stored presentation layer protocol data stream when the client agent 205 disconnects from the server 120. This prevents the server 120 from running out of storage space because too many historic recordings are saved on the server 120. In some embodiments, the shadowing agent service 230 stores the presentation layer protocol data stream in volatile memory of the server. In further embodiments, the shadowing agent service 230 encrypts the stored data stream in volatile memory on the server 120. In still further embodiments, the shadowing agent service 230 stores the stored data stream as a process-local temporary file designated for deletion upon close of the process.

In some embodiments, the shadowing agent service 230 transmits a recorded data stream from the remote presentation layer protocol stack 225. In some embodiments, where the recorded data stream is stored in multiple files, the shadowing agent service 230 merges or stitches the files together and transmits a single file containing the recorded data stream to the shadowing tool 210. At the same time, or substantially the same time, a first real time presentation layer protocol data stream from remote presentation layer protocol stack 225 is injected with data from a second real-time presentation layer protocol data stream from the shadowing tool 210. The shadowing agent service 230 then transmits the modified first real-time presentation layer protocol data stream to the shadowing tool 210. The shadowing tool 210 merges, stitches, concatenates or otherwise joins the transmitted recorded data stream with the modified first real-time presentation layer protocol data stream to generate an output stream that seamlessly joins the stored data stream and the data stream representing the shadower 110 controlling the user session 220 of the client 105. Generating a single data stream composed of recorded session data and real-time data permit easier consumption by the rendering agent of the shadowing tool.

In some embodiments, the shadowing tool 210 enables the shadower to generate an output stream using standard video playback features (such as play, stop, pause) as well as several other modes. These modes include, but are not limited to real-time, fast-forward, slow-forward, random seeking, and fast review. In some embodiments, the shadowing tool 210 enables the end-user to view the generated output stream using the standard features and modes describe above. The shadowing tool 210 joins the real-time data stream transmitted by the controller 232 and the saved data stream transmitted by the recorder 234 of the shadowing agent service 230 to provide a single output data stream that displays both historic and real-time session data.

In some embodiments, the shadowing tool 210 receives the pre-recorded presentation layer protocol data stream and a real-time presentation layer protocol data stream from the shadowing agent service 230 at substantially the same time. In some embodiments, when the shadowing tool 210 displays the single output data stream to the end-user, the shadowing tool may indicate the point of transition from the recorded presentation layer protocol data stream to the real-time presentation layer protocol data stream by displaying a message on the screen. In some embodiments, the message may indicate either that the display is showing pre-recorded data or real-time data. The message may be displayed in different fonts, colors, sizes, or with any other perceptibly different methods to indicate the state of the output stream. In other embodiments, the shadowing tool 210 may indicate a transition from historic and real-time session data by displaying the recorded presentation layer data stream in either a visually different hue or saturation in color than the real-time presentation layer protocol data. In some embodiments, when a shadowing tool disconnects from the shadowing agent service, the shadowing tool 210 deletes the files containing the received recorded presentation layer protocol data stream and any data stored from the real-time presentation layer protocol data stream.

Some embodiments may include a permission agent 240. The permission agent 240 is a software module executing in the user session 220. In some embodiments, the shadowing agent service 230 may communicate with the permission agent 240.

The permission agent 240 is a module executing within a user session 220. In some embodiments, the permission agent 240 displays a message within the session requesting information from the user. In some embodiments, the message generated by the permission agent 240 asks the user whether a shadower may connect to the user session to monitor the user session. In other embodiments, the message generated by the permission agent 240 asks the user whether a shadower may connect to the user session to control and monitor the user session. In some embodiments, the permission agent 240 obtains an amount of time from the client the application is permitted to record of the end-user's session. In some embodiments, the amount of time is at least four hours. In some embodiments, the amount of time may be up to eight hours. In some embodiments, the end-user may specify an amount of data from the end user's session that may be recorded. In some embodiments, record durations are determined or specified through a system policy and not the permission agent 240. In some embodiments, file lengths are determined or specified through a system policy and not the permission agent 240. In some embodiments, the permission agent 240 obtains permission from the end user of the client 105 to allow the shadower 120 to control or shadow their session.

In some embodiments, the permission agent 240 displays a notification to the client user when a shadower establishes a connection to the user session 220. In other embodiments, the permission agent 240 displays a notification to the client user when a shadower disconnects from the user session 220. In some embodiments, the notification contains the name or handle of the shadower. In other embodiments, the notification also contains contact information, such as an email or phone number of the shadower. In some embodiments, the permission agent 240 initiates when the user session 220 is established by the server 120. In other embodiments, the permission agent 240 is initiated when the shadowing agent service 230 initiates on the server 220. In still other embodiments, the permission agent 240 is initiated when a shadower 110 connects to the server 120. In still other embodiments, the permission agent 240 is initiated when the client 105 connects to the server 120.

Figure 2C:
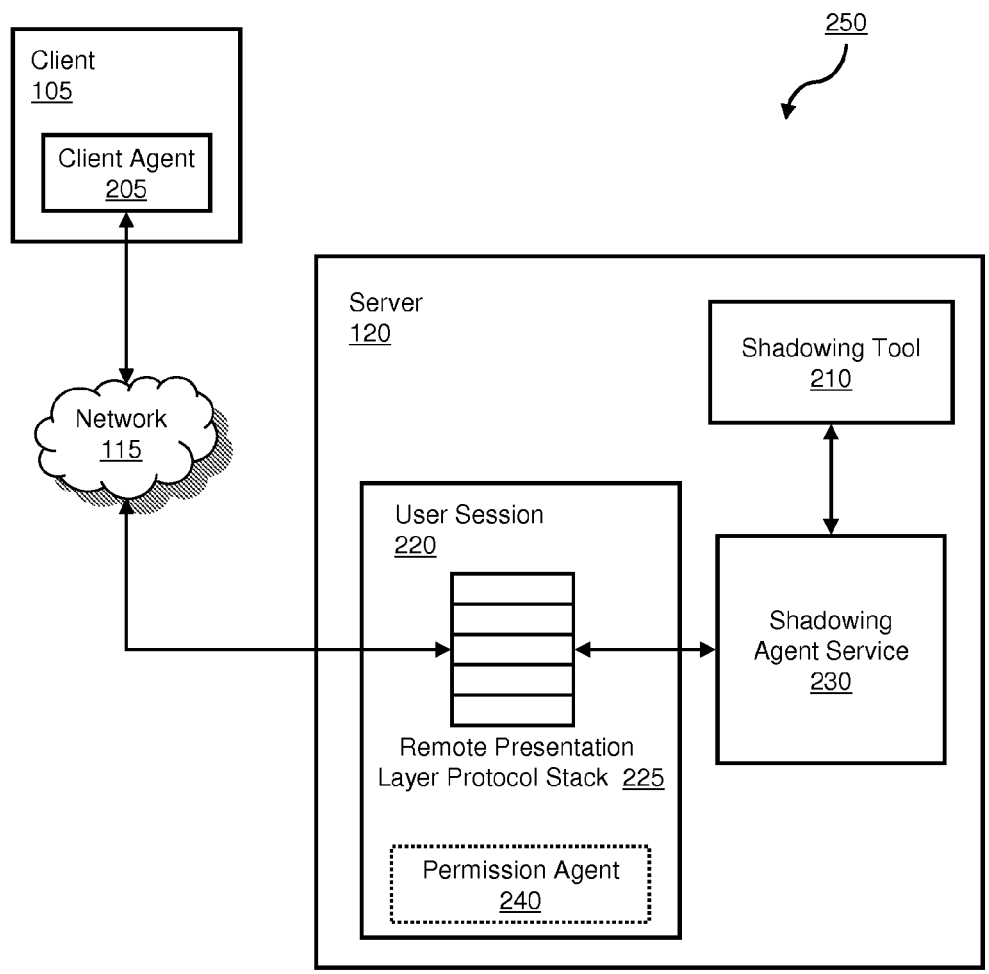
FIG. 2C is block diagram that depicts another embodiment of a system for providing single stack shadowing.

FIG. 2C is similar to FIG. 2B and will only be discussed in detail to the extent necessary to identify differences in configuration and/or functionality. FIG. 2C is a block diagram depicting another embodiment of a system for single stack shadowing. The present embodiment of the system 250 includes a client 105 and a server 120. The shadowing tool 210 is a software module that executes on the server 120. In some embodiments the shadowing tool 210 may execute within a user session 220. In some embodiments the shadowing tool 210 may execute on the server outside of the user session 220. The shadowing tool 210 may directly communicate with the shadowing agent service 230.

Figure 2D:
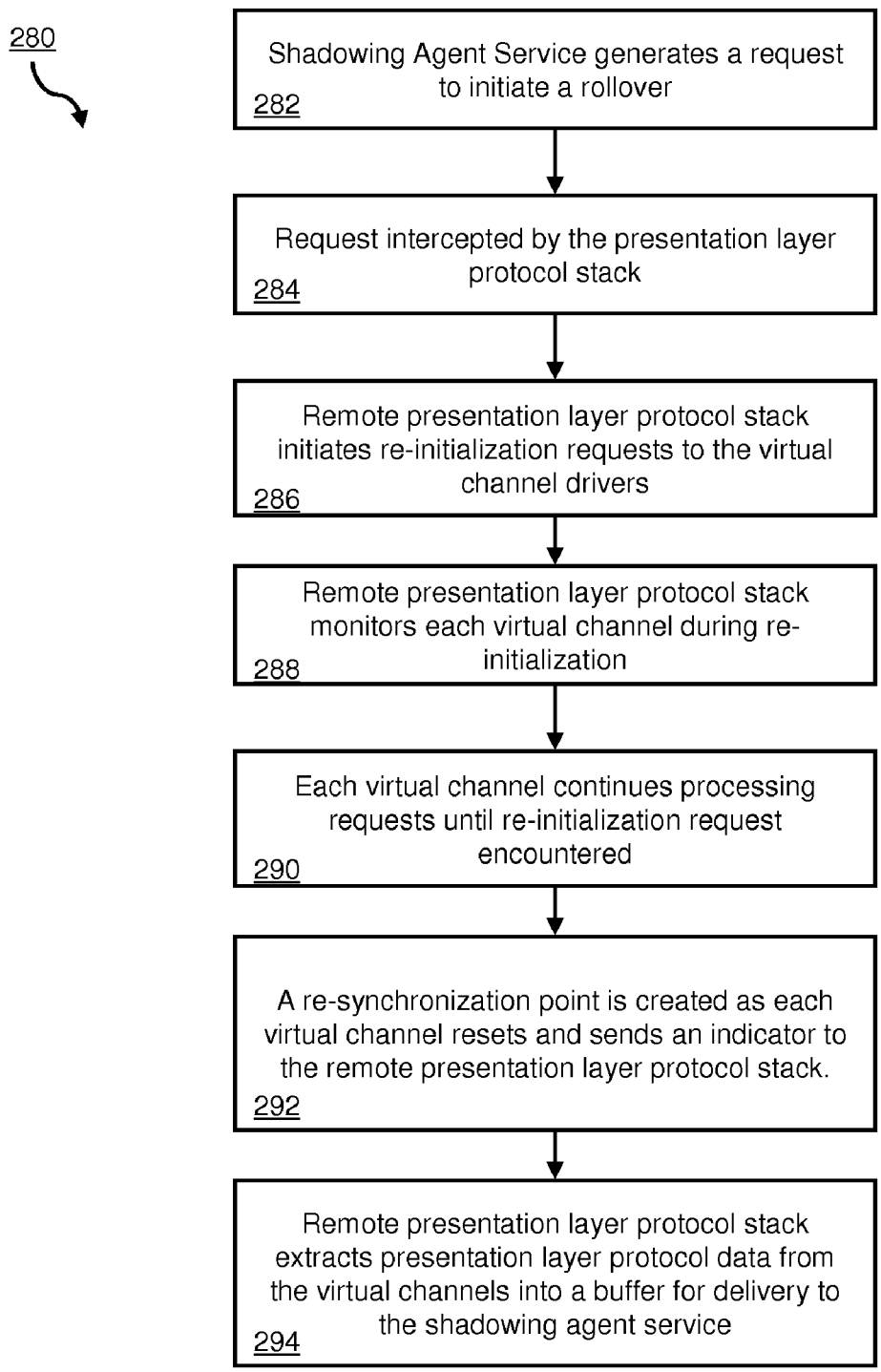
FIG. 2D is a flow diagram of an embodiment of a method for providing rollover used by the remote presentation layer protocol stack for single-stack shadowing.

FIG. 2D is a flow diagram of an embodiment of a method for rollover. Rollover is a technique that permits shadowing using a single remote presentation layer protocol stack. In brief overview, a shadowing agent service 230 generates a request to initiate a rollover in step 282. The request is intercepted by the remote presentation layer protocol stack in step 284. In step 286, the remote presentation layer protocol stack initiates a re-initialization request to the virtual channel drivers. In step 288, the remote presentation layer protocol stack monitors each virtual channel during re-initialization. In step 290, each virtual channel continues processing requests until the re-initialization command is encountered. In step 292, a re-synchronization point is created as each virtual channel resets and sends an indicator to the remote presentation layer protocol stack. In step 294, the remote presentation layer protocol stack extracts presentation layer protocol data from the virtual channels into a buffer for delivery to the shadowing agent service.

Now referring to FIG. 2D in greater detail, virtual channels of remote presentation layer protocol stacks can be stateful and any loss of data renders a data stream unplayable. Previously, in order to shadow a user, it was necessary to record all session data from the beginning of the stream to ensure that playback was possible. Rollover creates resynchronization points where the current file could be closed and a new file created. Rollover overcomes the problem of unmanageably large files resulting from graphically intense sessions or long-lived sessions. Rollover also provides a point in the protocol data stream from where session data can be played. In some embodiments, the recorded content of the new file is a continuation of the previous file except that it can be played back independently because the new file is recorded starting from a re-synchronization point. In other embodiments, the presentation layer protocol data stream is modified to contain a marker indicating the resynchronization point, from which point a session can be played independently from the data preceding the point. The virtual channel state machines are reset to their original state when a session is started. Rollover is the ability to reinitialize the state of various virtual channels being recorded without interrupting the user's session.

In one embodiment, a shadowing agent service 230 executing on a server 120 generates a request to initiate a rollover (Step 282). In some embodiments, request to initiate a rollover is generated each time a shadower 110 connects to the shadowing agent service 230. In other embodiments, a request to initiate a rollover is generated each time a shadowing tool 210 establishes a connection with the shadowing agent service 230. In other embodiments, a request to initiate a rollover is generated periodically according to a predetermined durational threshold. In some embodiments, the predetermined durational threshold may be set by an administrator in the system. In other embodiments, the predetermined durational threshold may be set by the manufacturer or distributor. In some embodiments, a request to initiate rollover is generated when a presentation layer protocol data stream stored in a storage element reaches a predetermined file size. In some embodiments, the predetermined file size threshold may be set by an administrator in the system. In other embodiments, the predetermined file size threshold is set by a system policy which determines the available space in the storage device and calculating a file size threshold based on the size of the available space. In some embodiments, the storage device resides on the server. In other embodiments, the storage device resides outside of the server. In other embodiments, the predetermined file size threshold may be set by the manufacturer or the distributor of the system. The data stream being recorded is stored to a file stored on a storage element on the server 120. When the file reaches the predetermined file size threshold or predetermined durational threshold, the file is closed and a new file is created. The new file continues to record the user session 220 as a continuation of the previously closed file.

In some embodiments, the shadowing agent service 230 generates a request to shadow a user session 220 which includes the number of shadowers 110 connecting to the server 120. In other embodiments, the shadowing agent service 230 generates a request each time a shadower 110 establishes a connection to the server 120. In other embodiments, the shadowing agent service 230 generates a request only after a permission agent 240 grants permission for the shadower 110 to shadow the user session 220. In other embodiments, the shadowing agent service 230 generates a request containing the specific virtual channel drivers that require re-initialization. In other embodiments, the shadowing agent service 230 generates a request for all virtual channel drivers to be re-initialized. In some embodiments, the request generated by the shadowing agent service 230 contains a high priority that requires immediate re-initialization of the virtual channel drivers. In other embodiments, the request generated by the shadowing agent service 230 contains a lower priority, which request re-initialization but permits the virtual channels to complete all prior existing processes.

In step 284, the request is intercepted by the remote presentation layer protocol stack 225. In some embodiments, the remote presentation layer protocol stack 225 intercepts all rollover requests from the shadowing agent service 230. In other embodiments, the remote presentation layer protocol stack 225 intercepts only requests from shadowing agent service 230 when the request is generated as a result of durational threshold rule. In other embodiments, the remote presentation layer protocol stack 225 intercepts only request from the shadowing agent service 230 when the request is generated as a result of a file size threshold rule. In other embodiments, the remote presentation layer protocol stack 225 intercepts only requests from the shadowing agent service 230 if the permission agent 240 has granted access to the shadower to shadow the user session 220.

In step 286, the remote presentation layer protocol stack initiates a re-initialization request to the virtual drivers. As the virtual channels of remote presentation layer protocol stacks 225 are stateful, in order to avoid data loss that renders the data stream unplayable, the virtual channels must be re-initialized. Re-initialization allows data to be extracted and streamed to the shadowing agent service without any loss. In some embodiments, the re-initialization request is sent to all the virtual channel drivers in the remote presentation layer protocol stack 225. In other embodiments, the re-initialization request is sent to only the virtual channel drivers specified by the generated request intercepted from the shadowing agent service 230.

In step 288, the remote presentation layer protocol stack 225 monitors each virtual channel during re-initialization. In some embodiments, the remote presentation layer protocol stack 225 monitors the type of data processed by the virtual channel. In other embodiments, the remote presentation layer protocol stack 225 monitors the time required to finish processing existing requests. In other embodiments, the remote presentation layer protocol stack 225 monitors the progress of the processing of existing requests in the virtual channels.

In step 290, each virtual channel continues processing requests until the re-initialization request is encountered. In some embodiments, re-initialization request will be queued and processed behind existing outstanding requests.

In step 292, a re-synchronization point is created as each virtual channel resets and sends an indicator to the remote presentation layer protocol stack 225. In some embodiments, an indicator is sent to the remote presentation layer protocol stack 225 after completion of all existing requests and another is sent after completion of the re-initialization. In other embodiments, the indicator is sent only after completion of the re-initialization of the virtual channel.

In step 294, the remote presentation layer protocol stack 225 extracts presentation layer protocol data from the virtual channels into a buffer for delivery to the shadowing agent service 230. In some embodiments, the presentation layer protocol data from the virtual channels is extracted and directly delivered to the shadowing agent service 230. In other embodiments, the remote presentation layer protocol stack 225 extracts data from certain virtual channels into a buffer for delivery to the shadowing agent service 230 while other data from other channels are delivered directly to the shadowing agent service 230. In other embodiments, the presentation layer protocol data is extracted into more than one buffer for delivery to the shadowing agent service 230.

Figure 2E:
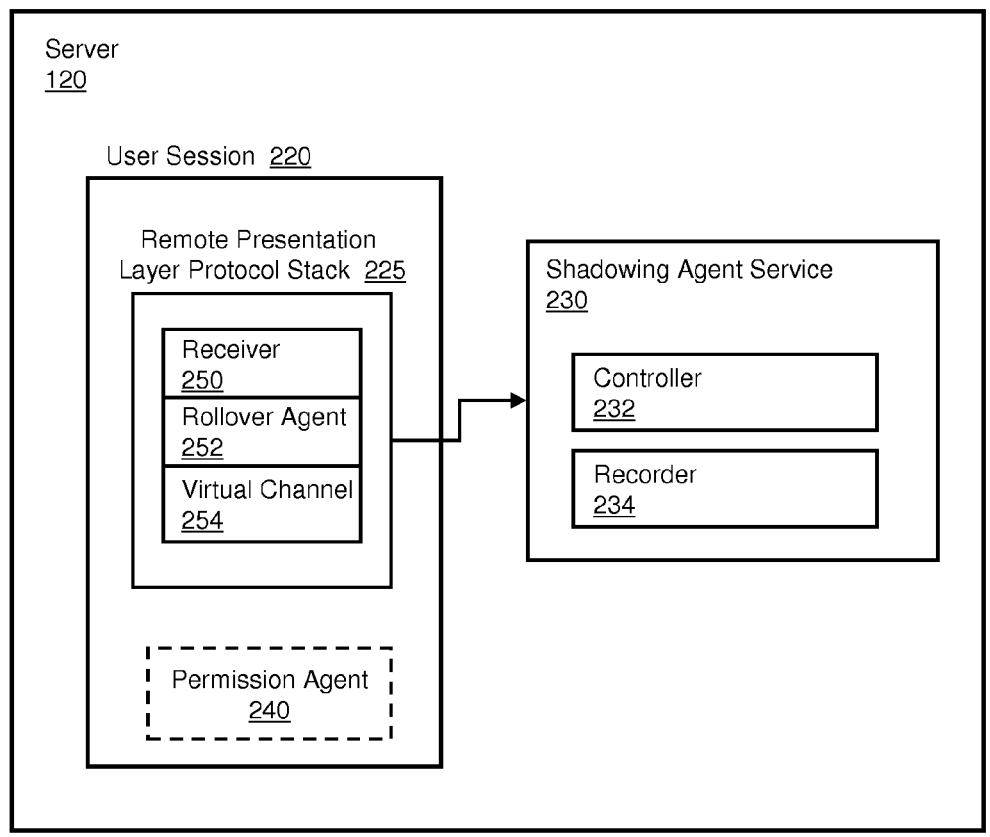
FIG. 2E is a block diagram that depicts a more detailed embodiment of a server that is part of a system for providing single stack shadowing.

FIG. 2E is a block diagram that depicts a more detailed embodiment of a server 120 that is part of a system 200 for providing single stack shadowing. In brief overview, the server 120 includes a user session 220 and a shadowing agent service 230. The user session includes a remote presentation layer protocol stack 225. The remote presentation layer protocol stack 225 includes a receiver 250, a rollover agent 252, and a virtual channel 254. Though the diagram only depicts a single virtual channel 254 for clarity, a remote presentation layer protocol stack 225 may comprise a plurality of virtual channels 254. The user session may include a permission agent 240, the function and features of which are discussed above. The shadowing agent service 230 includes a controller 232 and a recorder 234.

Now referring to FIG. 2E in greater detail, the controller 232 is a module of the shadowing agent service 230 that determines which of either the client 105 or the shadower 110 controls the user session 220. The controller 232 receives a real-time data stream from the remote presentation layer protocol stack 225. The controller 232 also receives a data stream from the shadowing tool 210 executing on the shadower 110. The shadowing tool 210 generates a data stream representing input device events, such as a mouse or keyboard. As such, specific keyboard strokes are not recorded, providing further security when a shadower is monitoring a user's session. In some embodiments, the controller 232 determines that a shadower may take control of the user session. The controller 232 injects or otherwise adds to the remote presentation layer protocol stack with data from the data stream from the shadowing tool 210. When the controller 232 determines that a shadower may not take control of the user session, data stream from the shadowing tool 210 is not injected into the stack 225.

The controller 232 is responsible for accepting connection requests from the one or more shadowers. In some embodiments, the controller 232 determines the shadowing permissions and policy. In some embodiments, the controller 232 initiates a rollover each time a shadower establishes a connection with the shadowing agent service 230. In some embodiments, the controller 232 receives a presentation layer protocol data stream from the shadowing tool 210. In some embodiments, the presentation layer protocol data stream is comprised of all of the user session data generated on the shadower 110. In other embodiments, the presentation layer protocol data is comprised of only input data, such as keyboard and mouse input, from the shadower 110. In some embodiments, there may be multiple shadowing tools 210, where multiple shadowers 110 all shadow a single user session 220 of a client. Only one shadower 110 may control the user session at a time. The controller 232 receives presentation layer protocol data streams from the multiple shadowing tools 210 and determines which of the shadowing tools 210 controls the user session 220. In some embodiments, control of the user session is determined by the time at which a shadowing tool 210 connected to the shadowing agent service 230. In other embodiments, control is determined by pre-set or pre-determined permissions. When a permission agent 240 is available, the controller 232 may communicate with the permission agent 240 to determine which shadowing tool 210 controls the user session 220. In other embodiments, the controller may determine which shadowing tool 210 controls the user session using a combination of factors, such as time connected, hierarchy of privileges, and number of shadowing tools 210.

The recorder 234 is a module of the shadowing agent service 230. The recorder 234 is responsible for recording a presentation layer protocol data stream. The recorder 234 initiates a rollover and receives and stores a data stream from the remote presentation layer protocol stack 225. The recorder 234 initiates a rollover when a predetermined file size or durational threshold is met. The recorder stores the data stream from the remote presentation layer protocol stack 225 in multiple files, in accordance with rollover, described above. Each file is independently playable. The beginning of each file is considered a re-synchronization point, the point from which a data stream can be viewed.

A receiver 250 is a module of the remote presentation layer protocol stack 225. The receiver 250 receives a message from the shadowing agent service 230. In some embodiments, the controller 232 of the shadowing agent service 230 sends the message. In other embodiments, the recorder 234 of the shadowing agent service 230 sends the message. The receiver also receives a presentation layer protocol data stream from a client agent executing on a computing device. The receiver may also receive a presentation layer protocol data stream from the shadowing agent service. The presentation layer protocol data stream from the shadowing agent service 230.

A rollover agent 252 is a module of the remote presentation layer protocol stack 225. The rollover agent 252 receives the rollover message from the receiver 250 and generates requests to the virtual channel 254. The rollover agent then enters a mode of monitoring for the virtual channel to complete its initialization. The virtual channel 254, (or each virtual channel 254, when there are a plurality of virtual channels) continues processing it existing backlog of requests as normal before encountering the reinitialization request. In some embodiments, the virtual channel pauses the processing of its existing backlog of requests and processes the reinitialization request. Once the virtual channel 254 completes processing the reinitialization request, the rollover agent 252 resets a virtual channel state machine to an original state. The rollover agent 252 then receives an indicator that the reinitialization of that virtual channel is complete. The indicator is the re-synchronization point, the point from which the data stream can be played independently from the data prior to that point. Once the virtual channel has completed its reinitialization, the rollover agent starts extracting presentation layer protocol data into a buffer from delivery to the shadowing agent service 230.

Although FIG. 2D shows a shadowing agent service 230 containing a controller 232 and a recorder 234, the controller 232 and the recorder 234 may be exist individually or grouped with other shadowing agent service modules, either within the a shadowing agent service 230 that may be executing on a single server 120 or on multiple servers 120.

Figure 3A:
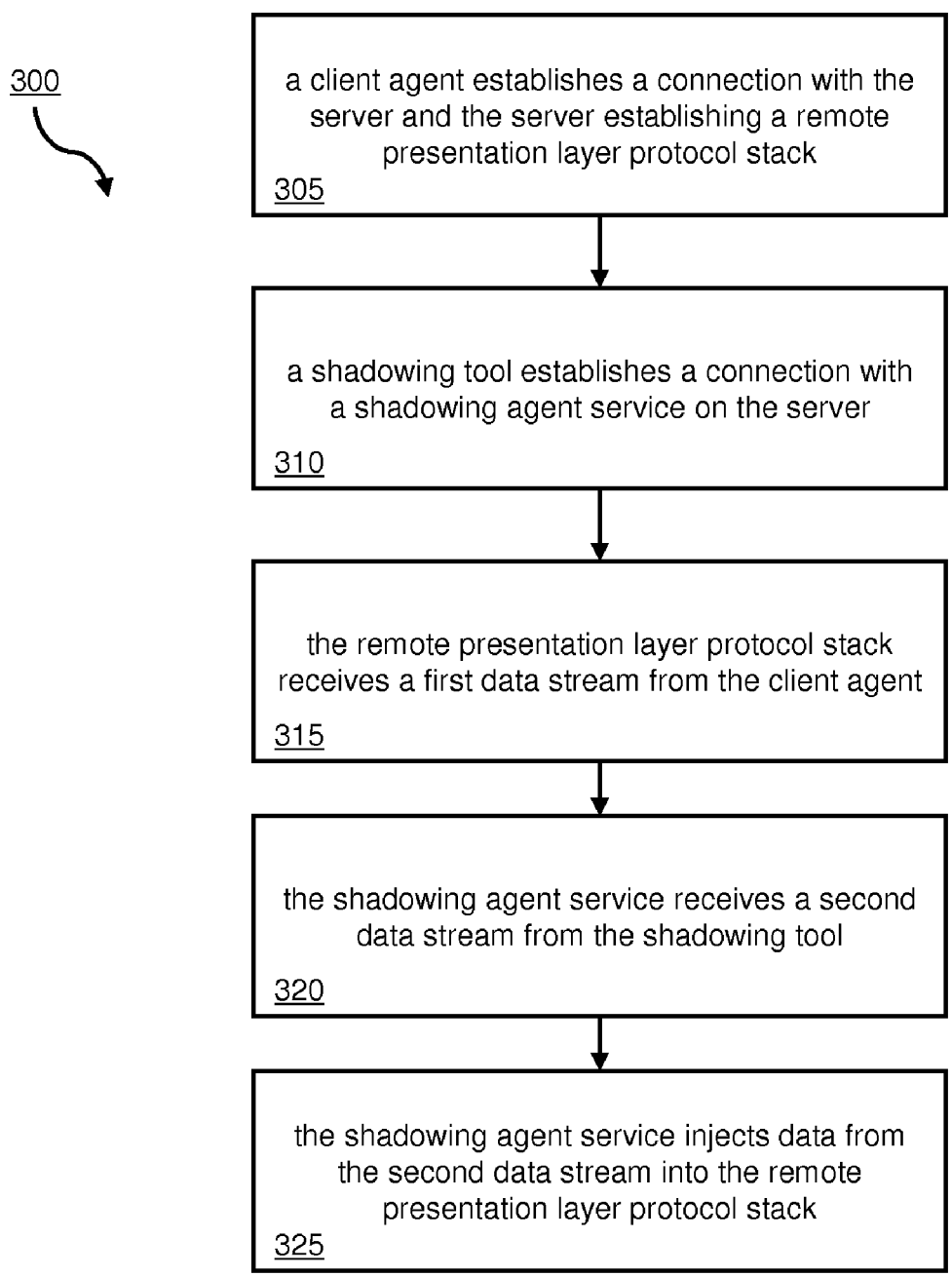
FIG. 3A is a flow diagram of an embodiment of a method for providing shadowing using a single remote presentation layer protocol stack.

FIG. 3A is a flow diagram of an embodiment of a method for providing shadowing using a single remote presentation layer protocol stack. In brief overview, the method 300 describes a method in which a shadowing agent service 230 executing on a server 120 communicates with the one or more shadowers 110. The shadowing agent service 230 determines which shadower 110 controls the session and then injects data from the shadower 110 controlling the user session 220 into the remote presentation layer protocol stack 225.

In step 305, a client 105 establishes a connection with a server 120. The server 120 establishes a user session 220 which contains a remote presentation layer protocol stack 225. The client agent 205 on the client 105 communicates with the remote presentation layer protocol stack 225. The shadowing agent service 230 communicates with the remote presentation layer protocol stack 225.

In step 310, a shadower 110 establishes a connection with the shadowing agent service 230 executing on the server 120. In some embodiments, multiple shadowers 110 may establish connections with the shadowing agent service 230 at the same time. In other embodiments, multiple shadowers 110 may be in communication with the shadowing agent service 230, each shadower 110 establishing a connection with the shadowing agent service 230 at a different time.

In step 315, the remote presentation layer protocol stack 225 receives a first data stream transmitted by the client agent 105. A rollover is initiated by the controller 232 of the shadowing agent service 230 each time a shadower 110 establishes a connection with the shadowing agent service 230. The virtual channels of the remote presentation layer protocol stack 225 are then reset to their original state, the file storing the data stream is closed, and a new file is created to continue storing the data stream from the remote presentation layer protocol stack 225.

In step 320, the shadowing agent service 230 receives a second data stream transmitted by the shadowing tool 210 executing on a shadower 110. The second data stream from the shadowing tool 210 represents input of the shadower 110. In the case of multiple shadowers 110, the shadowing agent service 230 determines which shadower will control the user session 220. In some embodiments, the shadowing agent service 230 determines which shadower of a plurality of shadowers has control by using the times at which the shadowers 110 established a connection with the shadowing agent service 230. In some embodiments, the first shadower to connect may control the user session. In other embodiments, the last shadower to connect may control the user session. In some embodiments, the shadowing agent service may determine which shadower has control based upon permissions of the shadowers. In other embodiments, the shadowing agent service may determine which shadower has control based upon shadower profile, which may include a person's name, position, geographic location, seniority, or experience. In other embodiments, the shadowing agent service may determine which shadower has control based upon a predetermined list provided by an administrator of the system.

In step 325, in the case of multiple shadowers, the shadowing agent service 230 determines which of the shadowers 110 controls the end-user's session. Control is determined by whether the shadowing agent service 230 injects data from the second data stream from the shadowing tool 210 executing on the shadower 110 into the remote presentation layer protocol stack 225. In some embodiments, the shadowing agent service 230 may determine that a shadower may not take control of the end-user's session. Then, the shadowing agent service 230 will not inject any data from the second data stream from the shadowing tool 210 into the remote presentation layer protocol stack 225. In other embodiments, the shadowing agent service 230 may determine that a shadower may take control of the end-user's session. The shadowing tool 210 captures input from the shadower 110. In some embodiments, the shadowing tool 210 does not capture keyboard input from the shadower 110 but will capture mouse and keyboard events which will be injected into the data stream from the remote presentation layer protocol stack 225.

In step 330, the shadowing agent service 230 transmits the modified first data stream from the remote presentation layer protocol stack 225 containing data from the second data stream from the shadowing tool 110 to the remote presentation layer protocol stack 225 and the shadowing tool 110 for display. In some embodiments, the shadowing agent service 230 also records the controlled user session 220. In further embodiments, the shadowing agent service 230 records the controlled user session 220 using rollover, as described above, where the virtual channels of the remote presentation layer protocol stack 225 are reset and files are closed and created according to file size or durational thresholds.

FIG. 3B is a flow diagram of an embodiment of a method for recording and controlling user session data using a single remote presentation layer protocol stack. In brief overview, the method 350 describes a method in which a shadowing agent service 230 executing on a server 120 communicates with a client 105 and a shadower 110. The shadowing agent service 230 records a session of a client 105. The shadowing agent service 230 then permits a shadower 110 to take control of the client 105. The shadower 110 may also view the recorded session data of the client 105 using real-time seeking and playback.

In step 355, a client 105 establishes a connection with the server 120. The server 120 establishes a user session 220 containing a remote presentation layer protocol stack 225.

In step 360, the shadowing agent service 230 executing on the server 120, receives and stores a first data stream from the remote presentation layer protocol stack 225. In some embodiments, prior to receiving and storing a data stream, the shadowing agent service communicates with the permission agent 240 to obtain permission from the client to record any data received from the presentation layer protocol stack 225. In some embodiments, the data stream is stored using rollover. Rollover resets the virtual channels of the remote presentation layer protocol stack 225, closes the file storing the data stream and creates a new file to continue recording the data stream. The files are closed and newly recreated when pre-determined durational or file-size thresholds are met or each time a shadower establishes a connection with the shadowing agent service. The specified duration may be pre-determined within the system 200 or by an administrator.

In step 365, a shadower 110 establishes a connection with the shadowing agent service 230 executing on the server 120.

In step 370, the shadowing agent service 230 receives a second data stream from the shadowing tool 210 executing on the shadower 110. If there are a plurality of shadowers 110, then the shadowing agent service 230 determines the shadower that controls the user session 220 and receives the data stream from the shadowing tool 210. The data received from the shadowing tool may comprise input events, such as from a mouse or keyboard.

In step 375, the shadowing agent service 230 injects the second data stream from the shadowing tool 210 executing on the shadower 110 into the remote presentation layer protocol stack 225. This step enables the shadower 110 to take control of the user session 220 of the client 105.

In step 380, the shadowing agent service transmits the recorded presentation layer protocol data stream and the real-time presentation layer protocol data stream to the shadowing tool 210. In some embodiments the recorded data stream is multiple files residing on the server or a separate storage device that has not yet been deleted as a result of rollover. In other embodiments, the recorded data stream is transmitted to a buffer of the shadowing tool. In other embodiments, the recorded data stream is transmitted to a buffer residing on the shadower. In some embodiments, the real-time presentation layer protocol data stream transmitted from the remote presentation layer protocol data stream is received by a buffer residing in the shadowing tool 210. In other embodiments, the data stream is received by a buffer residing outside of the shadowing tool on the shadower 110.

In step 385, the shadowing tool merges, concatenates, or otherwise joins the received recorded data stream and the received real-time data stream to create a single output stream.

In some embodiments, the recorded session data may be exported by the shadower 110 for later analysis. In other embodiments, the recorded session data may be saved by the shadower 110 for later analysis. In some embodiments the exported or saved recorded session data may be in their native recording format for playback. In other embodiments, the exported or saved recorded session data may be transcoded to other formats, allowing the shadower 110 to playback the data using a variety of tools. In further embodiments, the formats of the transcoded saved recorded session data may include, but are not limited to, AVI or MPEG.

In some embodiments, a user session is automatically shadowed when the user session 220 starts. This embodiment permits live monitoring of user activity without the need for manual intervention every time a session starts.

In other embodiments, user session activity is recorded along side a monitoring service. In an embodiment of a monitoring service, the monitoring service may include any type and form performance monitoring service. The performance monitoring service may include monitoring, measurement and/or management software and/or hardware, including data collection, aggregation, analysis, management and reporting. In one embodiment, the performance monitoring service includes one or more monitoring agents. The monitoring agent includes any software, hardware or combination thereof for performing monitoring, measurement and data collection activities on a device, such as a client, server or an appliance. In some embodiments, the monitoring agent includes any type and form of script, such as Visual Basic script, or Javascript. In one embodiment, the monitoring agent executes transparently to any application and/or user of the device. In some embodiments, the monitoring agent is installed and operated unobtrusively to the application or client. In yet another embodiment, the monitoring agent is installed and operated without any instrumentation for the application or device.

In some embodiments, the monitoring agent monitors, measures and collects data on a predetermined frequency. In other embodiments, the monitoring agent monitors, measures and collects data based upon detection of any type and form of event. For example, the monitoring agent may collect data upon detection of a request for a web page or receipt of an HTTP response. In another example, the monitoring agent may collect data upon detection of any user input events, such as a mouse click. The monitoring agent may report or provide any monitored, measured or collected data to the monitoring service. In one embodiment, the monitoring agent transmits information to the monitoring service according to a schedule or a predetermined frequency. In another embodiment, the monitoring agent transmits information to the monitoring service upon detection of an event.

In some embodiments, the monitoring service and/or monitoring agent performs monitoring and performance measurement of any network resource or network infrastructure element, such as a client, server, server farm, appliance, appliance, or network connection. In one embodiment, the monitoring service and/or monitoring agent performs monitoring and performance measurement of any transport layer connection, such as a TCP or UDP connection. In another embodiment, the monitoring service and/or monitoring agent monitors and measures network latency. In yet one embodiment, the monitoring service and/or monitoring agent monitors and measures bandwidth utilization.

In other embodiments, the monitoring service and/or monitoring agent monitors and measures end-user response times. In some embodiments, the monitoring service performs monitoring and performance measurement of an application. In another embodiment, the monitoring service and/or monitoring agent performs monitoring and performance measurement of any session or connection to the application. In one embodiment, the monitoring service and/or monitoring agent monitors and measures performance of a browser. In another embodiment, the monitoring service and/or monitoring agent monitors and measures performance of HTTP based transactions. In some embodiments, the monitoring service and/or monitoring agent monitors and measures performance of a Voice over IP (VoIP) application or session. In other embodiments, the monitoring service and/or monitoring agent monitors and measures performance of a remote display protocol application, such as an ICA client or RDP client. In yet another embodiment, the monitoring service and/or monitoring agent monitors and measures performance of any type and form of streaming media. In still a further embodiment, the monitoring service and/or monitoring agent monitors and measures performance of a hosted application or a Software-As-A-Service (SaaS) delivery model.

In some embodiments, the monitoring service and/or monitoring agent performs monitoring and performance measurement of one or more transactions, requests or responses related to application. In other embodiments, the monitoring service and/or monitoring agent monitors and measures any portion of an application layer stack, such as any .NET or J2EE calls. In one embodiment, the monitoring service and/or monitoring agent monitors and measures database or SQL transactions. In yet another embodiment, the monitoring service and/or monitoring agent monitors and measures any method, function or application programming interface (API) call.

In one embodiment, the monitoring service and/or monitoring agent performs monitoring and performance measurement of a delivery of application and/or data from a server to a client via one or more appliances, such as appliance and/or appliance. In some embodiments, the monitoring service and/or monitoring agent monitors and measures performance of delivery of a virtualized application. In other embodiments, the monitoring service and/or monitoring agent monitors and measures performance of delivery of a streaming application. In another embodiment, the monitoring service and/or monitoring agent monitors and measures performance of delivery of a desktop application to a client and/or the execution of the desktop application on the client. In another embodiment, the monitoring service and/or monitoring agent monitors and measures performance of a client/server application.

In one embodiment, the monitoring service and/or monitoring agent is designed and constructed to provide application performance management for the application delivery system. For example, the monitoring service and/or monitoring agent may monitor, measure and manage the performance of the delivery of applications via the Citrix XenApp. In this example, the monitoring service and/or monitoring agent monitors individual ICA sessions. The monitoring service and/or monitoring agent may measure the total and per session system resource usage, as well as application and networking performance. The monitoring service and/or monitoring agent may identify the active servers for a given user and/or user session. In some embodiments, the monitoring service and/or monitoring agent monitors back-end connections between the application delivery system and an application and/or database server. The monitoring service and/or monitoring agent may measure network latency, delay and volume per user-session or ICA session.

In some embodiments, the monitoring service and/or monitoring agent measures and monitors memory usage for the application delivery system, such as total memory usage, per user session and/or per process. In other embodiments, the monitoring service and/or monitoring agent measures and monitors CPU usage the application delivery system, such as total CPU usage, per user session and/or per process. In another embodiments, the monitoring service and/or monitoring agent measures and monitors the time required to log-in to an application, a server, or the application delivery system, such as Citrix Presentation Server. In one embodiment, the monitoring service and/or monitoring agent measures and monitors the duration a user is logged into an application, a server, or the application delivery system. In some embodiments, the monitoring service and/or monitoring agent measures and monitors active and inactive session counts for an application, server or application delivery system session. In yet another embodiment, the monitoring service and/or monitoring agent measures and monitors user session latency.

In yet further embodiments, the monitoring service and/or monitoring agent measures and monitors measures and monitors any type and form of server metrics. In one embodiment, the monitoring service and/or monitoring agent measures and monitors metrics related to system memory, CPU usage, and disk storage. In another embodiment, the monitoring service and/or monitoring agent measures and monitors metrics related to page faults, such as page faults per second. In other embodiments, the monitoring service and/or monitoring agent measures and monitors round-trip time metrics. In yet another embodiment, the monitoring service and/or monitoring agent measures and monitors metrics related to application crashes, errors and/or hangs.

In some embodiments, the monitoring service includes performance counters are used to determine causes of response problems. In some embodiments, a monitoring service and monitoring agent includes any of the product embodiments referred to as EdgeSight manufactured by Citrix Systems, Inc. of Ft. Lauderdale, Fla. In another embodiment, the performance monitoring service and/or monitoring agent includes any portion of the product embodiments referred to as the TrueView product suite manufactured by the Symphoniq Corporation of Palo Alto, Calif. In one embodiment, the performance monitoring service and/or monitoring agent includes any portion of the product embodiments referred to as the TeaLeaf CX product suite manufactured by the TeaLeaf Technology Inc. of San Francisco, Calif. In other embodiments, the performance monitoring service and/or monitoring agent includes any portion of the business service management products, such as the BMC Performance Manager and Patrol products, manufactured by BMC Software, Inc. of Houston, Tex.

What is claimed is:

1. A method for joining a real-time user session of presentation layer protocol data, the method comprising:
   (a) receiving, by a user session executing on a server, a presentation layer protocol data stream from a client agent executing on a client computing device, wherein the user session comprises a single presentation layer protocol stack;
   (b) sending, by the single presentation layer protocol stack, to a virtual channel module stored in memory, a request to reinitialize;
   (c) processing, by the virtual channel module stored in memory and executed by a processing circuit, an existing request until the request to reinitialize is encountered; and
   (d) modifying, by the single presentation layer protocol stack, the presentation layer protocol data stream to contain a marker; and
   (e) resetting, by the single presentation layer protocol stack, a virtual channel state machine to an original state in response to the request to reinitialize; wherein the request to reinitialize the virtual channel is sent in response to receiving a request to initiate a rollover from a shadowing agent service executing on the server; and
   (f) receiving, by the user session, a second presentation layer protocol data stream from a shadowing agent service executing on a server.

2. The method of claim 1, further comprising extracting, by the single presentation layer protocol stack, the presentation layer protocol data stream to a buffer.

3. The method of claim 1, further comprising pausing, by the virtual channel module stored in memory, the existing request until after the request to reinitialize is processed.

4. The method of claim 1, further comprising receiving, by the single presentation layer protocol stack, the request to initiate a rollover responsive to a connection request from a second computing device.

5. The method of claim 1, further comprising receiving, by the single presentation layer protocol stack, the request to initiate a rollover responsive to a durational threshold being met.

6. The method of claim 1, further comprising receiving, by the single presentation layer protocol stack, the request to initiate a rollover responsive to a file size threshold being met.

7. A system for joining a real-time user session of presentation layer protocol data comprising:
   a single presentation layer protocol stack contained within the real-time user session executing on a server comprising:
      a receiver module stored in memory and executed by a processing circuit to:
         receive a presentation layer protocol data stream from a client agent executing on a client computing device;
      a virtual channel module stored in memory, and executed by a processing circuit to:
         processes a request; and
      a rollover agent module stored in memory, and executed by a processing circuit to:
         send to the virtual channel a request to reinitialize; and
         modify the presentation layer protocol data stream to contain a marker;
      wherein the request to reinitialize the virtual channel is sent in response to receiving a request to initiate a rollover from a shadowing agent service executing on the server using a processing circuit and the single presentation layer protocol stack resets a virtual channel state machine to an original state in response to the request to reinitialize and wherein the user session receives a second presentation layer protocol data stream from a shadowing agent service executing on a server.

8. The system of claim 7, wherein the single presentation layer protocol stack extracts the presentation layer protocol data stream to a buffer.

9. The system of claim 7, wherein the virtual channel module pauses the existing request until after the request to reinitialize is processed.

10. The system of claim 7, wherein the single presentation layer protocol stack receives the request to initiate a rollover responsive to a connection request from a second computing device.

11. The system of claim 7, wherein the single presentation layer protocol stack receives the request to initiate a rollover responsive to a durational threshold being met.

12. The system of claim 7, wherein the single presentation layer protocol stack receives the request to initiate a rollover responsive to a file size threshold being met.

* * * * *